(12) United States Patent
Campbell et al.

(10) Patent No.: US 11,638,907 B2
(45) Date of Patent: May 2, 2023

(54) POROUS CERAMICS FOR ADDITIVE MANUFACTURING, FILTRATION, AND MEMBRANE APPLICATIONS

(71) Applicant: Lawrence Livermore National Security, LLC, Livermore, CA (US)

(72) Inventors: Patrick Campbell, Oakland, CA (US); Sarah Baker, Dublin, CA (US); Maira Ceron Hernandez, Livermore, CA (US); Jennifer Marie Knipe, Oakland, CA (US); Joshuah K. Stolaroff, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 128 days.

(21) Appl. No.: 16/706,526

(22) Filed: Dec. 6, 2019

(65) Prior Publication Data

US 2020/0114333 A1 Apr. 16, 2020

Related U.S. Application Data

(63) Continuation-in-part of application No. PCT/US2018/039113, filed on Jun. 22, 2018.
(Continued)

(51) Int. Cl.
*B01J 20/06* (2006.01)
*B01J 20/02* (2006.01)
(Continued)

(52) U.S. Cl.
CPC ............ *B01J 20/06* (2013.01); *B01D 53/228* (2013.01); *B01D 53/229* (2013.01); *B01D 53/62* (2013.01);
(Continued)

(58) Field of Classification Search
None
See application file for complete search history.

(56) References Cited

U.S. PATENT DOCUMENTS

| 9,275,773 B2 | 3/2016 | Andre et al. |
| 2008/0134895 A1 | 6/2008 | Ruud et al. |

(Continued)

FOREIGN PATENT DOCUMENTS

| WO | 9822387 A1 | 5/1998 |
| WO | 2006113674 A2 | 10/2006 |

(Continued)

OTHER PUBLICATIONS

International Search Report and Written Opinion from PCT Application No. PCT/US 18/39113, dated Nov. 5, 2018.
(Continued)

*Primary Examiner* — Daniel Berns
(74) *Attorney, Agent, or Firm* — Zilka-Kotab, P.C.

(57) ABSTRACT

In accordance with one aspect of the presently disclosed inventive concepts, a porous ceramic structure includes a three-dimensional printed structure having predefined features, where the three-dimensional structure has a geometric shape. The average length of the features may be at least 10 microns. The three-dimensional structure includes a ceramic material having an open cell structure with a plurality of pores, where the pores form continuous channels through the ceramic material from one side of the ceramic material to an opposite side of the ceramic material.

35 Claims, 14 Drawing Sheets

Related U.S. Application Data

(60) Provisional application No. 62/524,329, filed on Jun. 23, 2017.

(51) Int. Cl.

| | | |
|---|---|---|
| B01J 20/28 | (2006.01) | |
| B33Y 80/00 | (2015.01) | |
| B33Y 70/10 | (2020.01) | |
| B01D 69/14 | (2006.01) | |
| B01D 71/02 | (2006.01) | |
| B33Y 10/00 | (2015.01) | |
| B01D 53/22 | (2006.01) | |
| B01D 53/62 | (2006.01) | |
| B01D 53/80 | (2006.01) | |
| B01D 67/00 | (2006.01) | |
| B01J 20/04 | (2006.01) | |
| B01J 20/30 | (2006.01) | |
| B01J 20/32 | (2006.01) | |
| B01J 20/34 | (2006.01) | |

(52) U.S. Cl.
CPC ......... *B01D 53/80* (2013.01); *B01D 67/0079* (2013.01); *B01D 69/141* (2013.01); *B01D 71/024* (2013.01); *B01J 20/041* (2013.01); *B01J 20/28045* (2013.01); *B01J 20/28085* (2013.01); *B01J 20/3007* (2013.01); *B01J 20/3064* (2013.01); *B01J 20/3078* (2013.01); *B01J 20/3204* (2013.01); *B01J 20/3287* (2013.01); *B01J 20/3433* (2013.01); *B01J 20/3483* (2013.01); *B33Y 10/00* (2014.12); *B33Y 70/10* (2020.01); *B33Y 80/00* (2014.12); *B01D 2251/304* (2013.01); *B01D 2251/606* (2013.01); *B01D 2257/504* (2013.01)

(56) References Cited

U.S. PATENT DOCUMENTS

| | | |
|---|---|---|
| 2015/0090125 A1 | 4/2015 | Lin et al. |
| 2016/0272844 A1 | 9/2016 | Osaka et al. |
| 2018/0148378 A1 | 5/2018 | Mayr et al. |

FOREIGN PATENT DOCUMENTS

| | | |
|---|---|---|
| WO | 2011137398 A1 | 11/2011 |
| WO | 2017131790 A1 | 8/2017 |

OTHER PUBLICATIONS

Wei et al., "A novel fabrication of yttria-stabilized-ziiconia dense electrolyte for solid oxide fuel cells by 3D printing technique," International Journal of Hydrogen Energy, vol. 44, Feb. 6, 2019, pp. 6182-6191.

Zimbeck et al., "Stereolithography of Ceramics and Metals," IS&T's 50th Annual Conference, 1997, pp. 649-655.

Minas et al., "3D Printing of Emulsions and Foams into Hierarchical Porous Ceramics," Advanced Materials, vol. 28, 2016, pp. 9993-9999.

Zheng et al., "Ultralight, Ultrastiff Mechanical Metamaterials," Science, vol. 344, Issue 6190, Jun. 20, 2014, pp. 1373-1377.

Bae et al., "Integrally Cored Ceramic Mold Fabricated by Ceramic Stereolithography," International Journal of Applied Ceramic Technology, vol. 8, No. 6, 2011, pp. 1255-1262.

Bae et al., "Influence of Residual Monomer on Cracking in Ceramics Fabricated by Stereolithography," International Journal of Applied Ceramic Technology, vol. 8, No. 6, 2011, pp. 1289-1295.

Ceron et al., "Surpassing the conventional limitations of $CO_2$ separation membranes with hydroxide/ceramic dual-phase membranes," Journal of Membrane Science, vol. 567, Sep. 13, 2018, pp. 191-198.

Tomeckova et al., "Predictive models for the photopolymerization of ceramic suspensions," Journal of the European Ceramic Society, vol. 30, 2010, pp. 2833-2840.

Dong et al., "Synthesis of submicron polycrystalline MFI zeolite films on porous ceramic supports," Journal of Membrane Science, vol. 148, 1998, pp. 233-241.

Sasaki et al., "Influence of Microstructure on the Thermal Diffusivity of Sintered Porous YSZ," International Journal of Applied Ceramic Technology, vol. 8, No. 2, 2011, pp. 455-466.

Griffith et al., "Freeform Fabrication of ceramics via Stereolithography," Journal of the American Ceramic Society, vol. 79, No. 10, 1996, pp. 2601-2608.

Lu et al., "Synthesis and characterization of thin ceramic-carbonate dual-phase membranes for carbon dioxide separation," Journal of Membrane Science, vol. 444, 2013, pp. 402-411.

Vericella et al., "Encapsulated liquid sorbents for carbon dioxide capture," Nature Communications, vol. 6:6124, Feb. 5, 2015, pp. 1-7.

Stolaroff et al., "Microencapsulation of advanced solvents for carbon capture," Royal Society of Chemistry, Faraday Discussions, vol. 192, 2016, pp. 271-281.

Shi et al., "Capture $CO_2$ from Ambient Air Using Nanoconfined Ion Hydration," Angewandte Chemie International Edition, vol. 55, 2016, pp. 4026-4029.

Sato et al., "The Corrosion Behaviour of Ceramic Materials in Caustic Alkaline Solutions at High Temperature," Corrosion Science, vol. 33, No. 4, 1992, pp. 591-595.

Azonano, "Yttria Stabilized Zirconia, YSZ ($ZrO_2$ /$Y_2O_3$) Nanoparticles—Properties, Applications," AZoNano, Jul. 2, 2013, pp. 1-2.

Li et al., "Performance of ionic-conducting ceramic/carbonate composite material as solid oxide fuel cell electrolyte and $CO_2$ permeation membrane," Catalysis Today, vol. 148, 2009, pp. 303-309.

Anantharaman et al., "Dual phase high-temperature membranes for $CO_2$ separation—performance assessment in post-and pre-combustion processes," Faraday Discussions, (Abstract Only), Oct. 20, 2016, 2 pages.

Ho et al., "Enhanced $CO_2$ Solubility in Hybrid Adsorbents: Optimization of Solid Support and Solvent Properties for $CO_2$ Capture," The Journal of Physical Chemistry C, vol. 116, Jan. 12, 2012, pp. 3600-3607.

Ho et al., "Gas Uptake in Solvents Confined in Mesopores: Adsorption versus Enhanced Solubility," The Journal of Physical Chemistry Letters, vol. 4, Jun. 25, 2013, pp. 2274-2278.

Ho et al., "Solubility of Gases in Water Confined in Nanoporous Materials: ZSM-5, MCM-41, and MIL-100," The Journal of Physical Chemistry C, vol. 119, Aug. 27, 2015, pp. 21547-21554.

Lu et al., "Asymmetric Thin Samarium Doped Cerium Oxide? Carbonate Dual-Phase Membrane for Carbon Dioxide Separation," Industrial & Engineering Chemistry Research, vol. 53, Jul. 11, 2014, pp. 13459-13466.

Chung et al., "Dual-Phase Metal-Carbonate Membrane for High-Temperature Carbon Dioxide Separation," Industrial & Engineering Chemistry Research, vol. 44, No. 21, Sep. 13, 2005, pp. 7999-8006.

Lin, M., "Carbonate-ceramic dual-phase membrane for carbon dioxide separation," Journal of Membrane Science, vol. 357, Apr. 14, 2010, pp. 122-129.

Fang et al., "Hydrophobic porous alumina hollow fiber for water desalination via membrane distillation process," Journal of Membrane Science, vol. 403-404, Feb. 21, 2012, pp. 41-46.

Xing et al., "Steam-promoted$CO_2$ flux indual-phase$CO_2$ separationmembranes," Journal of Membrane Science, vol. 482, Mar. 2, 2015, pp. 115-119.

Lee et al., "New designs of ceramic hollow fibres toward broadened applications," Journal of Membrane Science, vol. 503, 2016, pp. 48-58.

Sato et al., "Corrosion Behavior of Alumina Ceramics in Caustic Alkaline Solutions at High Temperatures," Journal of the American Ceramic Society, vol. 74, No. 12, 1991, pp. 3081-3084.

(56) References Cited

OTHER PUBLICATIONS

Seo et al., "Chemically Tunable Ionic Liquids with Aprotic Heterocyclic Anion (AHA) for CO2 Capture," The Journal of Physical Chemistry B, vol. 118, May 8, 2014, pp. 5740-5751.
Campbell et al., U.S. Appl. No. 16/482,215, filed Jul. 30, 2019.
Bounaceur et al., "Membrane processes for post-combustion carbon dioxide capture: A parametric study," Energy, vol. 31, Issue. 14, Nov. 2006, 15 pages, retrieved from https://doi.org/10.1016/j.energy.2005.10.038.
International Preliminary Examination Report from PCT Application No. PCT/US2018/039113, dated Dec. 24, 2019.

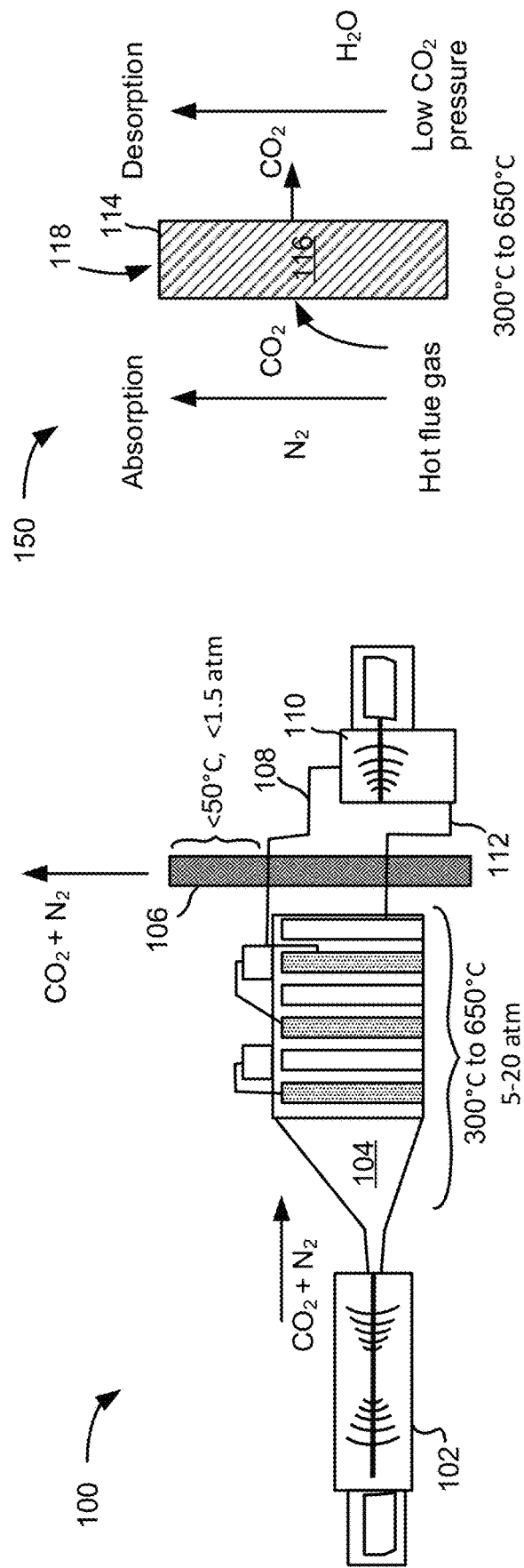

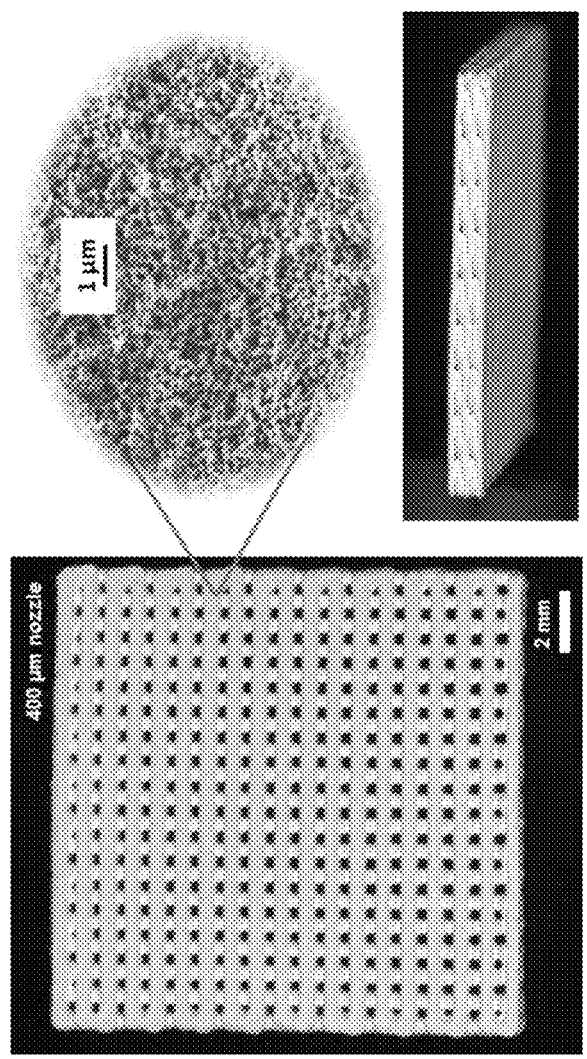
FIG. 5B
FIG. 5C
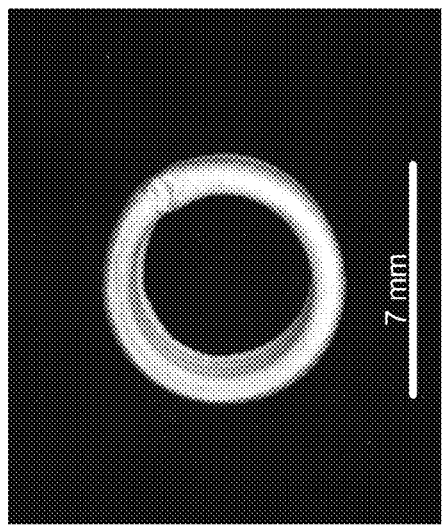
FIG. 5F
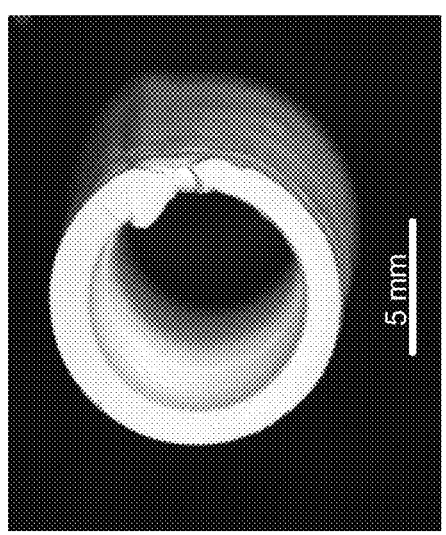
FIG. 5E
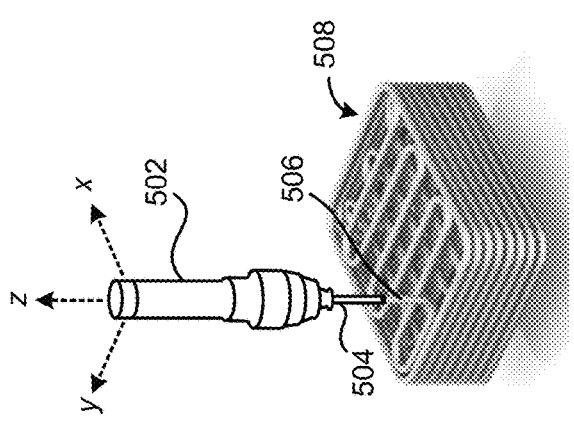
FIG. 5A
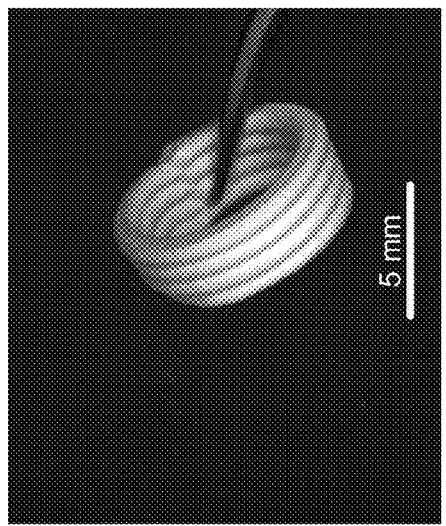
FIG. 5D

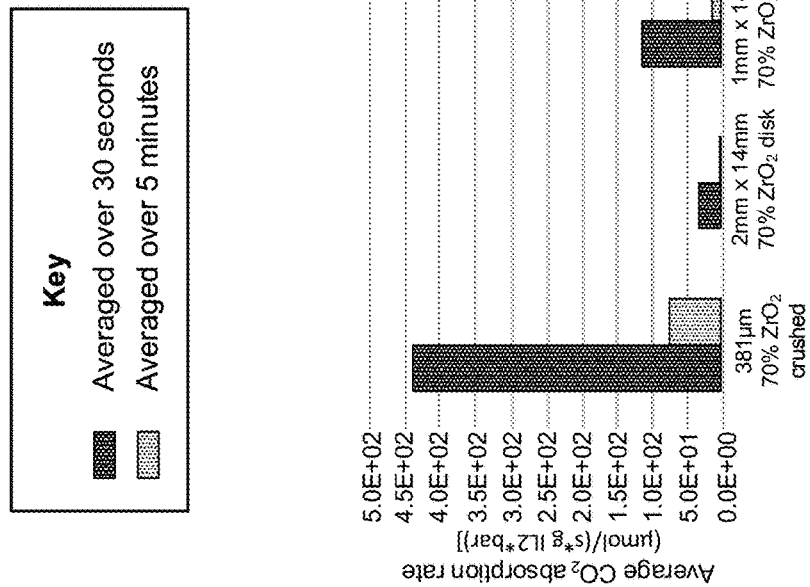
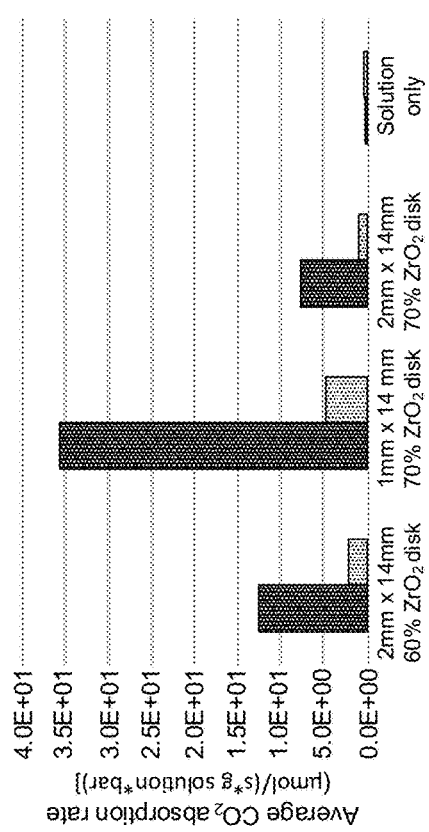

POROUS CERAMICS FOR ADDITIVE MANUFACTURING, FILTRATION, AND MEMBRANE APPLICATIONS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to porous ceramic materials with controlled, tunable porosity, and more particularly, this invention relates to porous ceramic particularly useful for porous ceramic structures infilled with sorbent solution for carbon dioxide capture.

BACKGROUND

Porous ceramic is a porous material with nanoscale porosity that may withstand extreme environmental conditions, for example, high temperatures, high pH, low pH, etc. Thus, application of porous ceramic material can range from gas and liquid filtration, catalyst supports, thermal insulators, biomedical application, etc. A conventional method of producing porous ceramic material with control of the pore size and density involves combining ceramic particles with sacrificial porogens in the green body. The porogens may be burned out during sintering to form voids in the final part. Some approaches to form ceramic parts have involved combining ceramic nanoparticles with inexpensive organic powders such as sucrose or rice flour as the sacrificial porogen, followed by casting discs in a powder press. However, this methodology limits throughput; the powder press can only make one disc at a time, and the process requires several hours at high pressure. Thus, in addition to the overall throughput being insufficient the method using sacrificial porogens is cost prohibitive to produce the volume of ceramic parts needed for large scale applications. An affordable and scalable process for forming porous ceramics with tunable and fine control of microporosity remains elusive.

Carbon dioxide ($CO_2$) separation from flue gas of fossil fuel burning power plants and other large point sources has become of particular interest as greenhouse gas emissions, and particularly $CO_2$ emissions has become a large scale concern in regards to environmental health as a contributor to global climate change.

One approach to limit the rise of $CO_2$ in the atmosphere is to capture the $CO_2$ at the source of emission and either sequester the $CO_2$ underground to keep it out of the atmosphere or utilize $CO_2$ as feedstock to make useful materials. This process known as carbon capture and sequestration (CCS) works best for large, fixed sources of $CO_2$ emissions, such as power plants and industrial facilities. Today, emissions from large point sources constitute over half of the total carbon emissions in the United States.

Fossil fuel power plants are the single largest source of anthropogenic carbon emissions world-wide. Typical fossil fuel power plants produce $CO_2$ as a relatively minor constituent in a mixture of exhaust gasses consisting mainly of $N_2$ and $H_2O$. For efficient storage, the $CO_2$ is separated from the mixture of exhaust gases (the carbon capture (CC) step), which can be challenging due to the dilute concentration of $CO_2$ and its low reactivity.

A current technology for carbon capture is liquid sorbent amine gas treatment. In this process, flue gas that has cooled to nearly ambient temperature (<50° C.) is bubbled through an aqueous solution containing basic amines (typically monoethanolamine, MEA), which react with the acidic $CO_2$ forming an acid-base adduct (e.g. carbamates). When the amine-containing solution becomes saturated with $CO_2$, it is pumped to a different reactor where it is heated above 100° C. to release the $CO_2$ for sequestration and regenerate the sorbent. However, carbon capture using amine gas treatment suffers from a number of drawbacks including low carbon dioxide loading capacity (kg $CO_2$ absorbed per kg absorbent), high equipment corrosion rate, sorbent degradation by various gases (e.g. $SO_2$, $NO_2$, HCl, HF, $O_2$, etc.) in flue gas as well as production of toxic degradation products. Moreover, the single largest issue with amine gas treatment is the extremely high energy needs for the regenerating the sorbent. For example, regenerating the sorbent may consume from 25% to as much as 40% of the total energy output of the power plant. Furthermore, an amine system adds an infrastructure to the power plan that about doubles the cost of a building the power plant.

Membrane gas separation may be a desirable alternative to amine gas treatment. Membrane separation may use much less energy than amine gas separation because membrane gas separation process is spontaneously driven by the difference in $CO_2$ partial pressure on either side of the membrane. Furthermore, membrane separation does not have a regeneration step.

Recent efforts toward developing highly selective polymer membranes for $CO_2$ separation, however, have drawbacks. Polymer membranes operate at low temperatures (typically <100° C.), which lowers the rate of $CO_2$ diffusion across the membrane. Very thin membranes may overcome the slow diffusion of $CO_2$, but the thinness of the membrane may impact mechanical properties and increase cost. In addition, since polymer membranes separate flue gas constituents based on the difference in their diffusion rates, the membranes may not be perfectly selective for $CO_2$.

In contrast to polymer membranes, dual phase membranes consist of a liquid phase supported by a porous solid phase in which the liquid is held in the pores by capillary force. For $CO_2$ separation, recent studies of dual phase membranes include a mixture of molten carbonate salts as the liquid phase.

Early approaches to dual-phase membranes for $CO_2$ separation with molten carbonate used a stainless steel support to transport carbonate ($CO_3^{2-}$) and electrons in opposite directions for selective permeation of $CO_2$ at high temperatures, higher than 450° C. However, these methods proved undesirable because the stainless steel support was susceptible to oxidation under the $CO_2/O_2$ atmosphere. Thus, applications of $CO_2$ separation turned to porous ceramic materials instead of stainless steel to support molten carbonate.

Studies have explored mixed metal oxides to synthesize carbonate-ceramic dual-phase membranes for $CO_2$ separation at high temperatures. Moreover, using an oxide-conducting ceramic support eliminates the need of electrodes. However, although oxidation of the metal support can be avoided under the $CO_2/O_2$ atmosphere, $CO_2$ permeance in the dual phase membranes of these systems tends to be less than desirable.

Better $CO_2$ permeance has been demonstrated in $CeO_2$ supported dual-phase membranes infilled with molten carbonate at 550° C. However, evaluations of pre- and post-combustion $CO_2$ capture processes (such as Integrated Gasification Combined Cycle (IGCC) and Natural Gas Combined Cycle (NGCC)) showed the dual-phase membranes were less effective when compared with aqueous solution processes, such as MEA (monoethanolamine). These dual-phase membrane processes have a higher energy penalty than MEA-based post-combustion capture, as demonstrated by the energy necessary to compress the feed stream and steam extraction to ensure sufficient driving force over the membrane. Thus, for acceptable $CO_2$ flux, these dual phase membranes operate at temperatures above 650° C., which is higher than the temperature of the flue gas present in the combustion turbine or boiler. The separation is rate-limited by oxide ($O^{2-}$) transport in the solid ceramic phase, which reacts with $CO_2$ to form carbonate. At temperatures below 650° C. oxide transport is very slow in the opposite direction through the solid phase.

Carbon dioxide capture from flue gas and other industrial gas sources may be optimally conducted today using liquid sorbents in which a base (e.g. MEA, potassium carbonate, ammonia, buffers such as phosphate, borate, etc.) is dissolved in water at high concentration. The efficiency of these systems is limited by the amount of base that can be dissolved, limiting the carrying capacity of the resulting fluid. As carbon dioxide dissolves in the liquid sorbent, an additional limit may be reached when solids precipitate as a result of the increased carbonate concentration. The presence of precipitated solids may cause system clogging, erratic capture behavior and difficulty in the regeneration of the liquid sorbent (typically done in a steam stripper requiring uniform contact between the liquid and the steam).

It would be desirable to develop a system of removing $CO_2$ from mixed gas streams (e.g. air) that is not dependent the dissolution of gas into a liquid phase, is energy efficient in releasing absorbed $CO_2$ and regenerating the sorbent, and uses less toxic components thereby reducing possible toxic degradation products.

Thus, it would be desirable to enable use of alternative sorbents, such as aqueous carbonate solutions, to mitigate the corrosivity and toxicity issues associated with amine-based sorbents. A class of sorbent materials called microencapsulated carbon sorbents (MECS) provides encapsulation a liquid carbonate solution inside a gas permeable polymer shell. MECS have shown a higher rate of $CO_2$ absorption compared with bulk sorbent solutions due to increased surface area of the polymer shells. However, regeneration of the absorbed $CO_2$ has proven problematic with MECS of higher carbonate concentration (and thus more efficient $CO_2$ absorption). The regeneration process tends to dry out the encapsulated solution leading to deformation of the polymer beads and decreased performance over time, and possibly even degradation of the polymer over many cycles.

It would be desirable to create a membrane system that could operate at temperatures of 300° C. to 650° C., where the minimum separation energy may be theoretically as low as 0.2 GJ/ton $CO_2$, which would be approximately 10 to 15 times less energy than the conventional sorbent-based amine gas treatment.

Accordingly, it would be beneficial to provide systems and techniques for separating carbon dioxide gas from emissions sources such as flue gas of fossil fuel power plants that are capable of operating at the incipient temperature of the flue gas as emitted from the combustion process with a sufficient energy (e.g. temperature) to effectively separate the carbon dioxide without consuming substantial power from the source and without associated infrastructure costs incurred by the existing techniques and systems described above.

It would be desirable to develop a porous ceramic material with tunable porosity with the ability to retain sorbent solution for an extended period of time for carbon dioxide capture.

SUMMARY

In accordance with one aspect of the presently disclosed inventive concepts, a porous ceramic structure includes a three-dimensional printed structure having predefined features, where the three-dimensional structure has a geometric shape. The average length of the features may be at least 10 microns. The three-dimensional structure includes a ceramic material having an open cell structure with a plurality of pores, where the pores form continuous channels through the ceramic material from one side of the ceramic material to an opposite side of the ceramic material.

In accordance with another aspect of another presently disclosed inventive concept, a product includes a ceramic material having an open cell structure with a plurality of pores, where the pores connect through the ceramic material from one side of the ceramic material to an opposite side of the ceramic material. In addition, the product includes an aqueous sorbent solution in the pores of the ceramic material, wherein a portion of the aqueous sorbent solution is retained in the pores by capillary action.

In accordance with another aspect of the presently disclosed inventive concepts, an ink for three dimensional printing a ceramic material includes metal oxide nanoparticles and a polymer resin, where a concentration of the metal oxide nanoparticles is at least about 50 wt % of a total mass of the ink.

In accordance with yet another aspect of the presently disclosed inventive concepts, a method of forming a porous ceramic material includes obtaining an ink, where the ink comprises a mixture of metal oxide nanoparticles and a polymer, forming a body from the ink, curing the formed body, heating the formed body for removing the polymer and for forming a porous ceramic material from the metal oxide nanoparticles. The forming the body includes an additive manufacturing process with the ink.

In accordance with yet another aspect of the presently disclosed inventive concepts, a method for separating gases with a system of porous ceramic material and an aqueous sorbent includes infilling a porous ceramic material in a sorbent solution, placing the infilled porous ceramic material in a container containing a known pressure of a gas, measuring an absorbance of the gas in the porous ceramic material infilled with the sorbent solution, and heating the porous ceramic material with $CO_2$ absorbed in the sorbent for releasing the $CO_2$ from the sorbent and regenerating the system of porous ceramic material and the sorbent.

Other aspects and advantages of the present invention will become apparent from the following detailed description, which, when taken in conjunction with the drawings, illustrate by way of example the principles of the invention.

BRIEF DESCRIPTION OF THE DRAWINGS

FIGS. 1A and 1B are schematic diagrams of a reversible $CO_2$ absorption by molten hydroxides above 250° C. in the presence of water vapor, according to inventive concepts described herein.

FIG. 5A is a schematic diagram of a direct ink writing process with a printing nozzle, according to inventive concepts described herein.

FIG. 5B is an image of a top down view of a log-pile three dimensional structure formed by direct ink writing. FIG. 5B includes a magnified view of a portion of the structure.

FIG. 5C is an image of a perspective view of a log-pile three dimensional structure formed by direct ink writing.

FIGS. 5D-5F are images of various perspective views of a cylindrical three dimensional structure formed by direct ink writing, according to inventive concepts described herein.

FIG. 6B includes a magnified view of a portion of the three dimensional structure.

FIG. 13A is a plot of rates of absorption of $CO_2$ with ceramic membrane samples infilled with sodium carbonate, according to inventive concepts described herein.

FIG. 13B is a plot of rates of absorption of $CO_2$ with ceramic membrane samples infilled with ionic liquid 1, according to inventive concepts described herein.

FIG. 13C is a plot of rates of absorption of $CO_2$ with ceramic membrane samples infilled with ionic liquid 2, according to inventive concepts described herein.

DETAILED DESCRIPTION

Figures 2A, 2B:
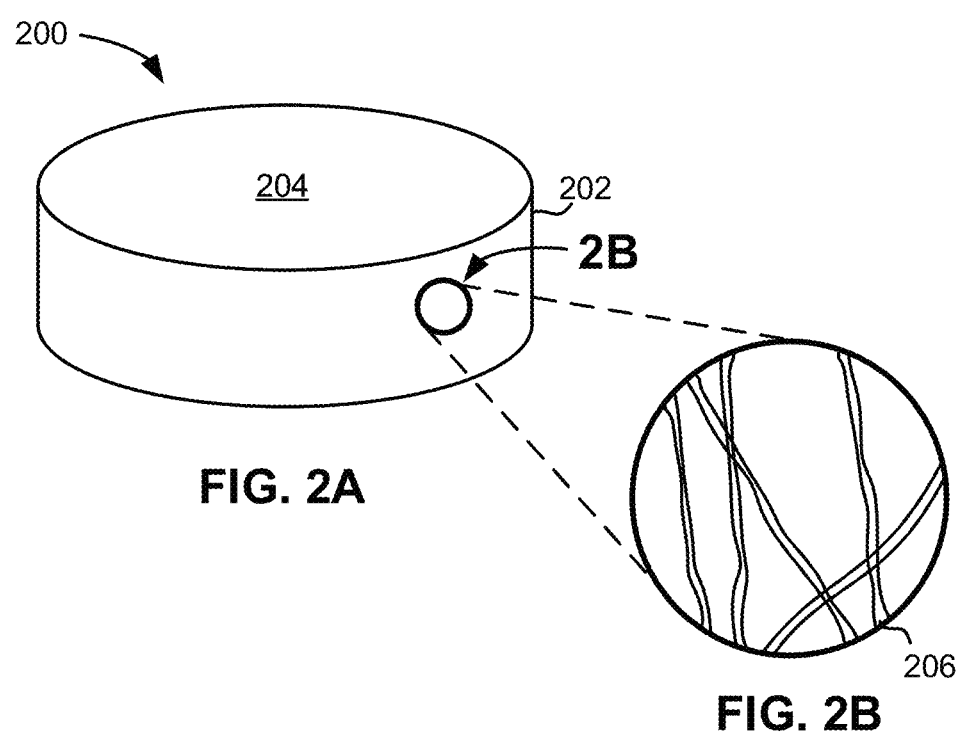
FIG. 2A is a schematic drawing of a porous ceramic structure, according to inventive concepts described herein.
FIG. 2B is a schematic drawing of a magnified view of circle 2B of FIG. 2A.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" when combined with a value refers to plus and minus 10% of the reference value. For example, a length of about 1 μm refers to a length of 1 μm±0.1 μm.

It is also noted that, as used in the specification and the appended claims, wt % is defined as the percentage of weight of a particular component is to the total weight/mass of the mixture. Moreover, mol % is defined as the percentage of moles of a particular component to the total moles of the mixture or compound.

In accordance with one general aspect of the presently disclosed inventive concepts, a porous ceramic structure includes a three-dimensional printed structure having pre-defined features, where the three-dimensional structure may be a geometric shape. The average length of the features may be at least 10 microns. The three-dimensional structure includes a ceramic material having an open cell structure with a plurality of pores, where the pores form continuous channels through the ceramic material from one side of the ceramic material to an opposite side of the ceramic material.

In accordance with another general aspect of the presently disclosed inventive concepts, a product includes a ceramic material having an open cell structure with a plurality of pores, where the pores connect through the ceramic material from one side of the ceramic material to an opposite side of the ceramic material. In addition, the product includes an aqueous sorbent solution in the pores of the ceramic material, wherein a portion of the aqueous sorbent solution is retained in the pores by capillary action.

In accordance with another general aspect of the presently disclosed inventive concepts, an ink for three dimensional printing a ceramic material includes metal oxide nanoparticles and a polymer resin, where a concentration of the metal oxide nanoparticles is at least about 50 wt % of a total mass of the ink.

In accordance with yet another general aspect of the presently disclosed inventive concepts, a method of forming a porous ceramic material includes obtaining an ink, where the ink comprises a mixture of metal oxide nanoparticles and a polymer, forming a body from the ink, curing the formed body, heating the formed body for removing the polymer and for forming a porous ceramic material from the metal oxide nanoparticles. The forming the body includes an additive manufacturing process with the ink.

In accordance with yet another general aspect of the presently disclosed inventive concepts, a method for separating gases with a system of porous ceramic material and an aqueous sorbent includes infilling a porous ceramic material in a sorbent solution, placing the infilled porous ceramic material in a container containing a known pressure of a gas, measuring an absorbance of the gas in the porous ceramic material infilled with the sorbent solution, and heating the porous ceramic material with $CO_2$ absorbed in the sorbent for releasing the $CO_2$ from the sorbent and regenerating the system of porous ceramic material and the sorbent.

The inventive concepts described herein provide an improvement to carbon dioxide capture with forming a porous ceramic structure that may be infilled with electrolyte solution or sorbent solution, and/or the related systems and methods.

A list of acronyms used in the description is provided below.
3D Three dimensional
$Al_2O_3$ Alumina, aluminum oxide
AM Additive manufacturing
BET Brunauer-Emmett-Teller theory surface area calculation
C Celsius
$CeO_2$ Cerium(IV) oxide
12Ce-TZP 12 mol % $CeO_2$ tetragonal $ZrO_2$ polycrystal
CCS Carbon capture and storage
$CO_2$ Carbon dioxide
g gram
GJ gigajoule
HEPA High efficiency particulate air
IL Ionic liquids
KOH Potassium hydroxide
LiOH Lithium hydroxide
(LiNaK)OH Mixture of equimolar amounts of LiOH/NaOH/KOH
MEA monoethanolamine
MECS Microencapsulated carbon sorbents
mg mg
ml milliliters
mol % mole percent
$Na_2CO_3$ Sodium carbonate
NaOH Sodium hydroxide
nm nanometer
PEGDA Polyethylene glycol diacrylate
PµSL Projection microstereolithography
SEM Scanning electron micrograph
$SiO_2$ Silicon oxide
$SnO_2$ Tin oxide
TGA Thermogravitational analysis
$TiO_2$ Titanium dioxide
µm micron, micrometer
UV Ultraviolet
wt % weight percent
3Y-TZP 3 mol % $Y_2O_3$ tetragonal $ZrO_2$ polycrystal
8YSZ 8 mol % $Y_2O_3$ fully stabilized $ZrO_2$
$ZrO_2$ Zirconium oxide Some approaches to lower the temperature of operation for dual-phase membranes while improving overall $CO_2$ flux may include transporting the oxide ion ($O^{2-}$) in the liquid phase. One approach may include replacing the molten carbonate with molten hydroxide; however, molten hydroxide may result in an irreversible reaction of $CO_2$ with hydroxide, although recent research has shown that at temperatures above 250° C. in the presence of sufficient water vapor (steam) $CO_2$ absorption by molten hydroxides may be reversible.

Thus, it is desirable for the support material of the molten hydroxide solution to be to be chemically (e.g. resistant to strong base, humid conditions, etc.) and thermally robust (e.g. withstand up to ~1000° C.). Moreover, a support material that has a pore size and morphology to retain the molten phase in the pores against modest differential pressure may also be desirable as a support system for aqueous carbonate solutions and/or ionic liquids.

Inventive concepts described herein demonstrate a method for producing porous ceramic materials with tunable density and pore morphology. Some of the methods described herein involve using a sacrificial polymer template that result in a three dimensional (3D) ceramic structure that may be chemically and thermally stable. In addition, the formed 3D ceramic structure may support infill materials, such as highly corrosive molten liquid salts (e.g. molten sodium hydroxide) at temperatures from 250° C. to 650° C. In some approaches, the formed 3D ceramic structure may support infill ionic liquids that may be liquid at temperatures from 250° C. to about room temperature (e.g. between about 20° C. and 25° C.). In other approaches, the formed 3D ceramic structure may support infill ionic materials at temperatures as high as about 1000° C.

In contemplative approaches, a system has been developed of small polymer capsules filled with aqueous carbonate solution to absorb $CO_2$. In these approaches, the $CO_2$ permeated through the polymer capsule until the capsule was saturated with $CO_2$. The saturated capsules could be transported and then heated to release the $CO_2$ to regenerate the $CO_2$ capture within the capsules. However, the regeneration step to release the absorbed $CO_2$ from the polymer capsules has not been successful. During the heating process, the polymer capsules tend to shrivel, melt together, and collapse. It would be desirable to develop a system of a porous support structure for an aqueous sorbent that would be able to regenerate absorbed $CO_2$.

Aspects of inventive concepts described herein produce a porous ceramic material that may be used to support a liquid phase that is confined in the pores by capillary forces. In some approaches to processes described herein, the porous ceramic material may form a high surface area structure that can withstand harsh chemical environments and high temperature environments. In other approaches, a porous ceramic membrane may be formed that may support aqueous carbonate and/or ionic-liquid solutions.

Inventive concepts described herein include a method for $CO_2$ capture based on a porous ceramic material with pores having a size in the range of about 10 s to 100 s of nm. In some approaches the pores may support an aqueous sorbent solution. In other approaches, the pores may support a corrosive solution, for example, molten carbonate, molten sodium hydroxide, etc. In further approaches, such solutions may be present in the pores.

Inventive concepts described herein demonstrate a thermally and chemically stable ceramic support may facilitate thermal regeneration of the sorbent, and may not significantly degrade at elevated temperatures and/or in the presence of corrosive chemicals. A method is described for forming a porous ceramic structure. In some approaches, the porous ceramic structure may be used for $CO_2$ capture.

Ceramic supports may be produced in arbitrary shape and/or size by casting into molds. In other embodiments, ceramic supports may be produced by additive manufacturing (AM) methods for greater selectivity of morphology and further optimized $CO_2$ absorption performance. Other methods of formation may include extrusion, roll pressing, etc.

FIG. 1A is a schematic drawing of a system 100 of a combined-cycle natural gas power plant. As shown, the exhaust from a combustion turbine 102, including primarily $CO_2$ and $N_2$, flows into a heat exchanger 104. The heat exchanger 104 heats water producing steam 108 that powers a steam turbine 110 and which is then condensed to liquid water 112 in a closed loop. The heat exchanger 104 removes heat from the flue gas (which exits the combustion turbine at 300° C. to 650° C.) cooling the gases for release 106 at less than 50° C. Conventional carbon capture methods involve capturing the carbon at the release 106 stage. However, cold $CO_2$ separation at temperatures lower than 50° C. with atmospheric pressure less than 1.5 atm tend to be energetically inefficient. It would be desirable to develop a separation membrane process that could operate along with or inside the heat exchanger 104 when the gases are at high temperatures of 300° C. to 650C with a pressure of 5 to 20 atm.

FIG. 1B shows a schematic diagram of a dual phase membrane process 150 of absorption and desorption of $CO_2$ using a dual phase membrane 118 that includes molten hydroxide 116 in a porous support 114. The hot flue gas includes $N_2$, $CO_2$, etc. that upon contacting the membrane 118, the $CO_2$ may be selectively absorbed by the molten hydroxide 116 according to Equation 1, where M=alkali metal.

$$2MOH + CO_2 \rightarrow M_2CO_3 + H_2O \quad \text{Equation 1}$$

The $CO_2$ absorbed with the molten hydroxide 116 in the porous support 114 may be transported across the membrane 118 and desorbed in a desorption step of Equation 2, thereby demonstrating a reversible reaction of the $CO_2$ with molten hydroxide 116 of the porous support 114.

$$M_2CO_3 + H_2O \rightarrow 2MOH + CO_2 \quad \text{Equation 2}$$

The desorption step of Equation 2 may be initiated by low $CO_2$ pressure and steam to release $CO_2$ from the membrane on the sweep side of the porous support 114.

In more approaches, and preferable in some applications to reduce energy consumption associated with separation of offensive and/or acidic gases from gas mixtures such as flue gas, the presently disclosed inventive separation membranes and processes may accomplish separation without applying a pressure gradient via use of a sweep gas. For instance, in one embodiment water vapor may be passed across the permeate side of the membrane (opposite the side where offensive and/or acidic gases are present in high concentration, e.g. in the flue). Optionally, but advantageously, the sweep gas may apply pressure to the permeate side of the membrane.

Using a sweep gas is an attractive approach for several reasons. First, the water pushes the equation (2) equilibrium over to favor $CO_2$ release on the permeate side of the membrane. Second, $CO_2$ separates at a higher rate than without sweep gas utilization, because the sweeping action maintains a larger $CO_2$ gradient across the membrane than a vacuum, with less energy. Third, if the steam pressure applied to the permeate side of the membrane is approximately equal to the pressure applied to the membrane by the gas mixture (e.g. flue side), there is no difference in total pressure across the membrane, which significantly relaxes the materials challenges for capillary action (pore size) and mechanical strength. Fourth, steam is already present and available in various suitable applications, such as power plants (where steam is used in the heat exchanger), obviating the need to provide external sources of steam and further improving energy efficiency of separation. Fifth, water vapor can be easily separated from the $CO_2$ after gas separation (e.g. via condensation), which further allows advantageous harvesting of heat from the water vapor. Accordingly, a faster movement of acid gases across the membrane may desirably minimize infrastructure quantity and cost of the overall separation process/solution.

Porous Ceramic Material

FIGS. 2A and 2B depict schematic drawings of perspective views of a product 200 that includes a porous ceramic structure, in accordance with inventive concepts described herein. As an option, the present product 200 may be implemented in conjunction with features from any other embodiment listed herein, such as those described with reference to the other FIGS. Of course, however, such product 200 and others presented herein may be used in various applications and/or in permutations which may or may not be specifically described in the illustrative embodiments listed herein. Further, the product 200 presented herein may be used in any desired environment.

According to inventive concepts described herein, a product 200 includes a porous ceramic structure 202. FIG. 2B is a schematic drawing of the circle 2B of ceramic structure 202. FIG. 2B depicting a magnified portion of the porous ceramic structure 202, shows the porous ceramic structure 202 may have an open cell structure with a plurality of pores 206, where the pores 206 may connect through the ceramic structure 202 from one side of the ceramic structure to an opposite side of the ceramic structure.

In one approach, a porous ceramic structure includes a three-dimensional printed structure having predefined features. In various approaches the features may include ligaments, corners, ridges, design protrusions wherein the geometric structure has protrusions as part of the design, etc. In one approach, the three-dimensional structure has a geometric shape, for example a complex 3D shape (e.g., log-pile, cylinder, gyroid, octa-truss, etc.). In one approach, an average length of the features of the printed 3D structure may be at least 10 μm.

In one approach, the 3D structure includes a ceramic material as described herein, having an open cell structure with a plurality of pores. In some approaches, the pores form continuous channels through the ceramic material from one side of the ceramic material to an opposite side of the ceramic material. In one approach, the pores are connected. In another approach, not all the pores form continuous channels, but enough of the pores form continuous channels such that the ceramic material retains fluid in the pores. In one approach, fluid may be retained in the pores by capillary action.

In various approaches, a size of each of the plurality of pores is about nanometer scale, e.g., the pores are nanopores. In one approach the average diameter of each of the plurality of pores is less than 10 nanometers. In one approach, the average diameter of each of the plurality of pores is less than 50 nanometers. In one approach, the average diameter of each of the plurality of pores is in a range of about 50 nanometers to about 500 nanometers.

In some approaches, the ceramic structure may include alumina ($Al_2O_3$). In other approaches, the ceramic material of the ceramic structure may include $Y_2O_3$-doped $ZrO_2$. For example, but not limited to, the ceramic material may be 8 mol % yttria fully stabilized zirconia (8 mol % $Y_2O_3$-doped $ZrO_2$ (8YSZ)) or 3 mol % yttria (tetragonal zirconia polycrystal (3 mol % $Y_2O_3$-doped $ZrO_2$ (3Y-TZP)). In yet other approaches, the ceramic material may be at least one of the following: $CeO_2$, 12 mol % $CeO_2$ tetragonal $ZrO_2$ polycrystal (12Ce-TZP), $ZrO_2$, $SiO_2$, $TiO_2$, $SnO_2$, etc. In preferred approaches, the ceramic structure may include 3 mol % $Y_2O_3$-doped $ZrO_2$. In other preferred approaches, the ceramic structure may include 8 mol % $Y_2O_3$-doped $ZrO_2$.

The porous ceramic structure 202 may be formed in any suitable configuration. While the configuration shown in FIG. 2A is characterized by a circular configuration, other shapes may be implemented without departing from the scope of the present disclosures. In various approaches, a variety of other geometries in various dimensions may be formed.

In some approaches, the porous ceramic material may have a geometry represented by multiple structures such that the resulting porous ceramic structure may have a diameter of about 1 to about 10 cm but could be smaller or larger. In some approaches, the porous ceramic material may be extruded, milled, molded, printed, etc. into shapes (e.g. cylinder, cube, etc.), etc. In some approaches, the formed structures of porous ceramic material may have pores, features such as ligaments, corners, ridges, etc. having a size of about 100 to about 200 nm.

In some preferred approaches, following formation of a porous ceramic structure 202, the structure may be crushed into a porous ceramic material having the same composition and same pore structure as the porous ceramic structure in the form of a plurality of crushed pieces. Moreover, the porous ceramic structure may be defined as porous ceramic material. In some approaches, the porous ceramic material may be in the form of a crushed ceramic structure having a plurality of crushed pieces, wherein an average diameter of the plurality of crushed pieces is less than 400 μm.

In some approaches, the porous ceramic structure (e.g. porous ceramic material) may have pores having an average diameter sufficient to retain liquid by capillary action. For this purposes of this description, capillary action is defined as the adhesion of liquid within the pores of a ceramic structure such that the pores induce a surface tension of the liquid that retains the liquid in the pores. Furthermore, capillary action allows the liquid to flow into the pores of the porous ceramic material and retains the liquid in the pores.

In some approaches, the porous ceramic structure may have pores having an average diameter in a range of about 50 nm to about 500 nm, but the diameter of the pores may be lower or higher. In some approaches, the porous ceramic structure may have pores having a diameter in a range from approximately 75 nm to about several (e.g. 10) microns. As will be understood by persons having ordinary skill in the art upon reading the present descriptions, larger pore size is desirable to facilitate rapid mass transport through the membrane, but pores must be sufficiently small to retain the molten hydroxide phase within the matrix when subjected to the pressure gradient generated within the separation environment. In preferred approaches, the porous ceramic structure may have pores having an average diameter in a range of about 50 nm to about 300 nm.

Furthermore, pores may have an average diameter in a range from about 10 nm to about 1 mm, from about 100 nm to about 100 am, from about 100 nm to about 10 am, from about 200 nm to about 5 am, or in a range from about 200 nm to about 1 am, in various embodiments. As will be appreciated by skilled artisans upon reading the present disclosures, the pore size is critical to retention of liquid (e.g. hydroxide) in pores of the porous support structure under a given pressure gradient.

In some embodiments, the density of the porous ceramic structure (e.g. porous ceramic material) may be in a range of about 20% to about 50% of a density of a solid ceramic form, but could be higher or lower. In a preferred approach, the density of the porous ceramic structure may be in a range of about 20 wt % to about 50 wt % of a density of a solid nonporous ceramic form having the same composition as the porous ceramic structure. In some approaches, sintering the structure at higher temperature conditions may result in a density of the porous ceramic structure in a range of about 45 wt % to about 85 wt % of a density of a solid ceramic form.

In some approaches, the ceramic porous structure may be used as a filtration medium. In one approach, the ceramic porous structure may be printed as a shape with high contact area, e.g., a tube, where a plurality of the ceramic porous structures may be packed into a filter bed. In one application, a gas may flow through the filter bed having a plurality of ceramic porous structures, such that particles from the gas flow interact with the features, pores, etc. of the ceramic porous structures, and the particles may be pulled from the gas into the ceramic porous structure. In one approach, the ceramic porous structures may function as a high efficiency particulate air (HEPA) filter.

Porous Ceramic Structure Infilled with Liquid

According to inventive concepts described herein, the porous ceramic structure may function as a support for a liquid phase, where the liquid phase may be contained in the pores using capillary pressure. Preferably, the average pore size is such that the liquid phase substantially remains in the pores under conditions corresponding to the intended use of the resulting product. Furthermore, the porous ceramic structure infilled with a liquid may function as a membrane to selectively transport materials (e.g. $CO_2$) from one side of the membrane to the other. In some approaches, the pores may be a size that holds a liquid in a pore against an arbitrary pressure applied across the membrane. For example, smaller pores may withstand higher pressure applied across a membrane; however, smaller pores may result in a reduced capacity for liquid and a slower mass transport rate.

Looking to FIGS. 2A and 2B, in some approaches, the porous ceramic structure 202 may include a liquid 204, for example, molten hydroxide, in the pores 206, where the liquid 204 is retained in the pores 206 by capillary action. In some approaches the porous ceramic structure may include a molten potassium hydroxide. In other approaches, the molten hydroxide may be a mixture of LiOH, NaOH, and KOH. In various approaches, the porous ceramic structure including a molten hydroxide may be used for capturing $CO_2$. In some approaches, the product 200 may include a porous ceramic structure 202 with liquid 204 (e.g., molten hydroxide) disposed in the continuous pore system defined by the voids of the porous support.

In inventive concepts described herein, a porous ceramic structure may retain molten hydroxide in extreme conditions with long term stability, such as high temperatures over an extended period of time. In some approaches, the ceramic structure may have physical characteristics that enable the ceramic structure to retain the molten hydroxide in the pores after exposure to temperatures at about 400° C. for at least 100 hours under nitrogen gas ($N_2$). In some approaches, the ceramic structure may have physical characteristics that enable the ceramic structure to retain the molten hydroxide in the pores after exposure to high temperatures (e.g. 400° C.) for at least 1000 hours under nitrogen gas ($N_2$). In some approaches, the ceramic structure may have physical characteristics that enable the ceramic structure to retain molten hydroxide in the pores at high temperatures (e.g. 400° C.) for as long as 17,520 hours (i.e. 2 years).

According to inventive concepts described herein, the ceramic structure may have physical characteristics that enable the ceramic structure to retain the molten hydroxide in the pores after at least twenty heating and cooling cycles, wherein the heating may be to about 400° C. and the cooling may be to at least room temperature (room temperature may be between 20° C. to 25° C.). In some approaches, the porous ceramic structure may retain molten potassium hydroxide during greater than 40 heating and cooling cycles.

In other approaches, the porous ceramic structure 202 may include a liquid 204 such as an aqueous sorbent solution that is retained in the pores 206 by capillary action, as will be described below. In yet other approaches, the porous ceramic structure 202 may be crushed into porous ceramic material that may include an infill of liquid 204 such as aqueous sorbent solution that is retained in the pores 206 by capillary action.

Fabrication of a Porous Ceramic Material

Figure 3:
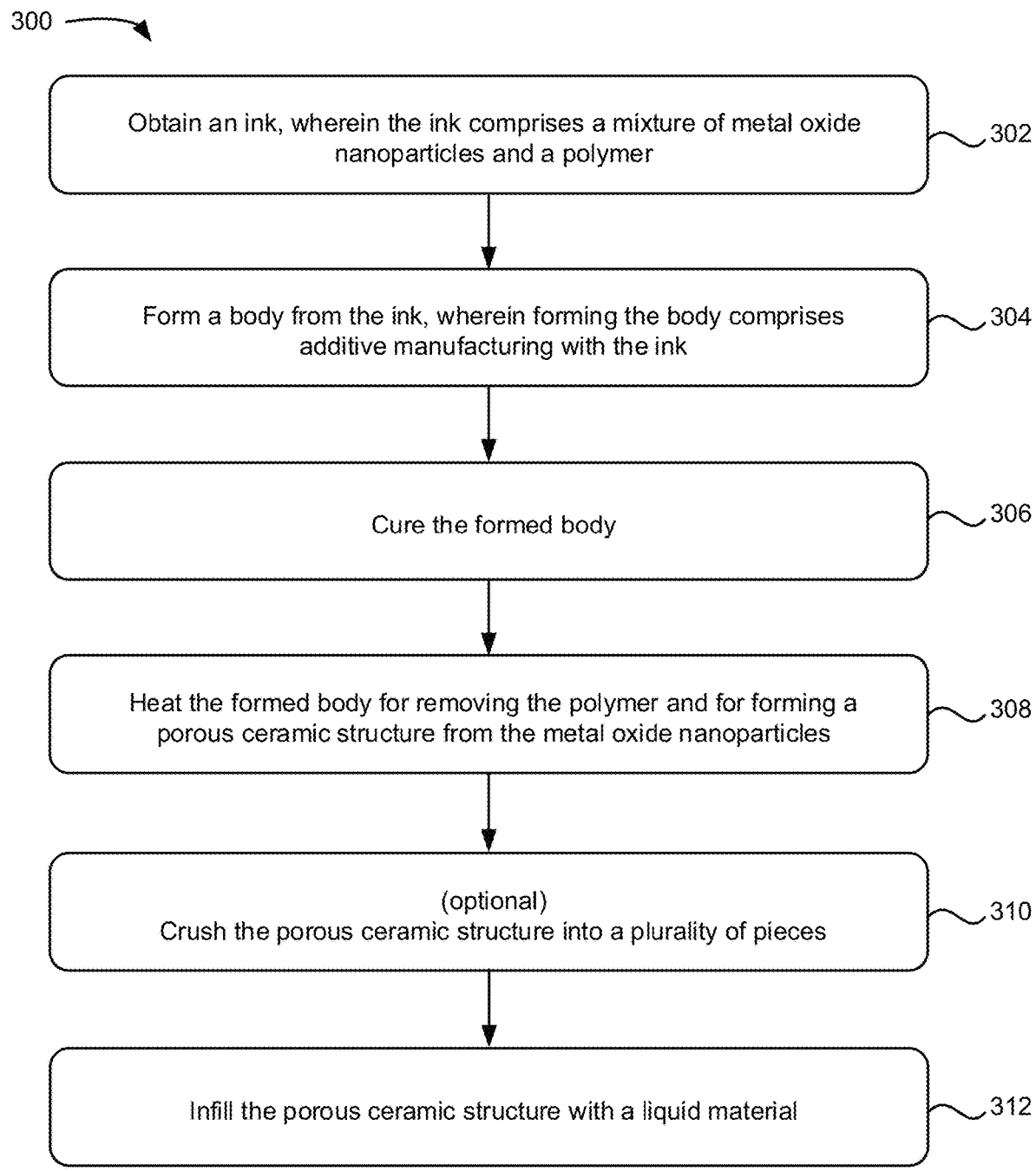
FIG. 3 is a flow chart of a method according to inventive concepts described herein.

FIG. 3 shows a method 300 for forming a porous ceramic material for carbon capture. As an option, the present method 300 may be implemented to construct structures such as those shown in the other FIGS. described herein. Of course, however, this method 300 and others presented herein may be used to form structures which may or may not be related to the illustrative concepts listed herein. Further, the methods presented herein may be carried out in any desired environment. Moreover, more or less operations than those shown in FIG. 3 may be included in method 300. It should also be noted that any of the aforementioned features may be used in any of the embodiments described in accordance with the various methods.

As shown in FIG. 3, step 302 of method 300 involves obtaining an ink, wherein the ink comprises a mixture of metal oxide nanoparticles and a polymer. In some approaches, an ink may be obtained from commercial sources.

In an exemplary approach, an ink may be formed according to inventive concepts described herein. An ink for three dimensional (3D) printing may include metal oxide nanoparticles and a polymer resin, where a concentration of the metal oxide nanoparticles is at least about 50 wt % of a total mass of the ink.

In various 3D printing methods (e.g., direct ink writing, PµSL, etc.) the concentration of metal oxide nanoparticles may be greater than 50 wt % of total mass of the ink. In one approach, the concentration of metal oxide nanoparticles may be greater than 55 wt % of total mass of the ink. In another approach, the concentration of metal oxide nanoparticles may be greater than 60 wt % of total mass of the ink. In yet another approach, the concentration of metal oxide nanoparticles may be greater than 65 wt % of total mass of the ink. In yet another approach, the concentration of metal oxide nanoparticles may be up to 70 wt % of total mass of ink.

In various approaches, the concentration of ceramic material in an ink depends on size of metal oxide nanoparticles, and the concentration of the metal oxide nanoparticles in the ink. For example, an ink that includes metal oxide nanoparticles having an average diameter of 90 nm, then the concentration of ceramic in the ink may be greater than 65 wt % of total mass of ink.

Without wishing to be bound by any theory, it is believed that the concentration of ceramic material, e.g., metal oxide nanoparticles, included in the ink may determine some mechanical properties of the printed structure. In one approach, the concentration of ceramic material affects the density of the material of the printed structure. In one approach, the concentration of ceramic material affects the pore size of the material of the printed structure.

In various approaches, many types of metal oxide nanoparticles may be used for forming an ink. In an exemplary approach, metal oxide nanoparticles may include yttria-doped zirconia ($Y_2O_3$-doped $ZrO_2$). For example, but not limited to, metal oxide nanoparticles may include 8 mol % yttria fully stabilized zirconia (8 mol % $Y_2O_3$-doped $ZrO_2$ (8YSZ)) or 3 mol % yttria (tetragonal zirconia polycrystal (3 mol % $Y_2O_3$-doped $ZrO_2$ (3Y-TZP)). In other approaches, metal oxide nanoparticles may include alumina ($Al_2O_3$). In yet other approaches, metal oxide nanoparticles may include at least one of the following: $CeO_2$, 12 mol % $CeO_2$ tetragonal $ZrO_2$ polycrystal (12Ce-TZP), $ZrO_2$, $SiO_2$, $TiO_2$, $SnO_2$, etc. In some approaches, metal oxide nanoparticles may be synthesized using methods known by one skilled in the art. In some approaches, any ceramic particles that can be fused by sintering may be used. For example, but not limited to, ceramic particles such as nitrides, carbides, oxy-nitrides, -carbides, etc. may be used as nanoparticles in some approaches.

In some approaches, metal oxide nanoparticles may have any conceivable size for nanoparticles. In some approaches, the size of the nanoparticles may be arbitrary, e.g. the size may be defined by ability of the nanoparticles to form homogeneous slurries, by the desired pore size of the resulting ceramic structure for a given application, etc.

In preferred approaches, a majority of the nanoparticles have a maximum dimension smaller than 1000 nm. In some approaches, metal oxide nanoparticles may have an average size in the range from about 20 nm to about 600 nm, but the size may be smaller or larger. In some approaches, larger nanoparticles may diminish nanoporosity of the porous ceramic structure. In some approaches, one mixture may include nanoparticles of different sizes.

In some approaches, a size of the metal oxide nanoparticles may depend on the desired pore structure of the printed part. In one approach, a metal nanoparticle having a larger average diameter may generate a pore size of less than 1 micron in the material of the printed part. Alternatively, for a material having smaller pore sizes, a metal nanoparticles having a smaller average diameter may be preferred for the polymer resin using in the printing process. For example, and not meant to be limiting, for retaining a liquid phase in the printed structure, the ceramic material of the printed structure may preferably have a pore size of less than 100 nanometers (nm), and thus, the polymer resin for printing may include larger metal oxide nanoparticles having an average diameter of less than 1 micron. In an exemplary example of a structure retaining a liquid phase, the ceramic material of the printed structure may preferably have a pore size of less than 500 nm, and thus the polymer resin for printing may include metal oxide nanoparticles having an average diameter of less than 500 nm.

In some approaches, an average diameter of metal oxide nanoparticles may be in a range of about 50 nm to about 500 nm. In preferred approaches, an average diameter of metal oxide nanoparticles may be in a range of 50 nm to about 100 nm.

Figure 15B:
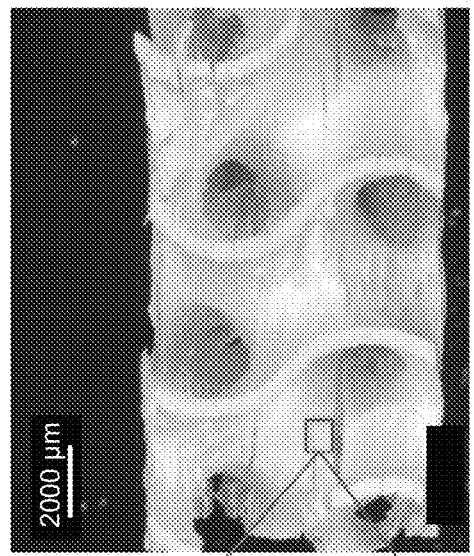
FIG. 15B is an image of a structure printed with an ink that includes nanoparticles having an average diameter of 90 nanometers, according to one aspect of an inventive concept.
Figure 15C:
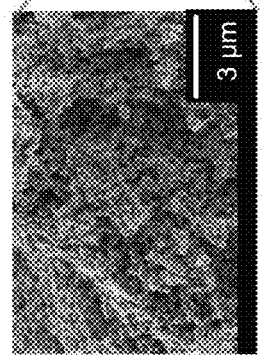
FIG. 15C is in image of a magnified view of a portion of the structure of image shown in FIG. 15B, according to one aspect of an inventive concept.
Figure 15A:
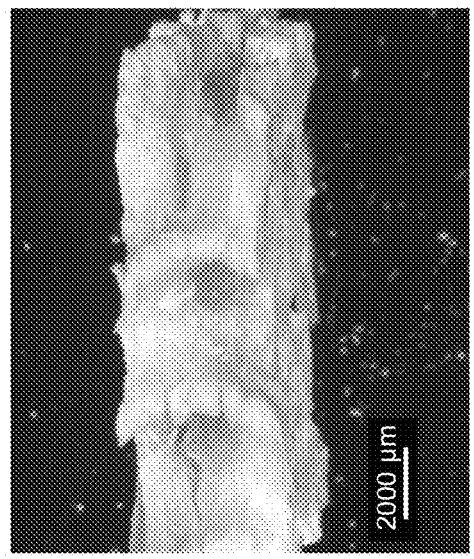
FIG. 15A is an image of a structure printed with an ink that includes nanoparticles having an average diameter of 40 nanometers, according to one aspect of an inventive concept.

In printing process such as projection microstereolithography (PuSL), metal oxide nanoparticles having an average diameter of greater than 90 nm may decrease cracking in the printed structure (as shown in FIGS. 15A-15C).

The polymer may be a polymer resin. The polymer resin may generally include any cross-linkable polymer. The polymer resin may be an acrylate that can be cross-linked using a thermal initiator (e.g. a cross-linking agent), for example but not limited to, polyethylene glycol diacrylate (PEGDA) plus a thermal initiator (e.g. 3 wt % Luperox 231).

In some approaches, the polymer resin may include a photo-initiator. In one approach, the polymer resin may be an acrylate that may be cross-linked using an ultraviolet (UV) light-activated initiator. In some approaches, the polymer resin may include a photo-initiator and an inhibitor.

Moreover, the polymer resin may include other materials.

The ratio of metal oxide nanoparticles in the polymer resin of the mixture may vary depending, for example, on the intended use, desired porosity, etc. In some approaches, the concentration of metal oxide nanoparticles in polymer resin of the mixture may be in the range of about 50 wt % to about 80 wt % of a total mass of the ink. For example, the ratio of metal oxide nanoparticles to the concentration of polymer resin in terms of wt % of total mass of ink may about be 50:50 to 80:20. In preferred approaches, a concentration of the metal oxide nanoparticles may be about 60 wt % of the total mass of the ink, and a ratio of metal oxide nanoparticles to polymer resin of 60:40. In some approaches, a concentration of the metal oxide nanoparticles may be about 70 wt % of a total mass of the ink, and a ratio of metal oxide nanoparticles to polymer resin of 70:30.

In some approaches, the concentration of metal oxide nanoparticles may depend on the type of nanoparticles and/or metal oxides in the metal oxide nanoparticles. For example, if the ratio results in a dilute mixture of nanoparticles in polymer resin, the particles may settle out of the solution, the final porous ceramic structure may not have a final density high enough for mechanical strength, etc. Moreover, if the ratio results in a concentrated mixture of nanoparticles in polymer resin, the mixture may be too difficult to process, and not have an appropriate viscosity, e.g. the mixture may resemble clay rather than flowable, viscous liquid usable for molding.

The physical characteristics of the porous ceramic membrane, for example, but not limited to density, pore morphology, mechanical properties, etc., may be tuned by varying the ratio of metal oxide nanoparticles to polymer resin. In some approaches, the process conditions may be particularly selected depending on the ratio of metal oxide nanoparticles to polymer resin, as would be appreciated by one skilled in the art upon reading the present description.

In various approaches to step 302 of method 300, the mixture may be combined using techniques known in the art, for example but not limited to, sonication, resonant acoustic mixing (RAM), vortex, etc.

Step 302 of method 300 may include blending the mixture of metal oxide nanoparticles and a polymer with a conventional cross-linking agent into a homogenous mixture. In some approaches, the cross-linking agent may be a liquid. In other approaches, the cross-linking agent may be a solid. In some approaches, the cross-linking agent may be a thermal initiator. In other approaches, the cross-linking agent may be a photo-initiator, e.g. 2-hydroxy-2-methylpropiophenone. In some approaches, the cross-linking agent blended in the homogenous mixture may be Luperox®.

In various approaches, the mixture of metal oxide nanoparticles and a polymer may include an inhibitor for controlling the polymerization of the mixture during printing. For example, and not meant to be limiting, a mixture of metal oxide nanoparticles and a polymer used as a UV-curable ceramic resin may include an inhibitor for printing using PuSL techniques. In one approach, an inhibitor may prevent over curing during printing of a 3D structure. In one approach, an inhibitor may tune size of printed features of the 3D structure. For example, an inhibitor in the metal oxide nanoparticle and polymer resin reduces feature size of a printed part.

In some approaches, a concentration of inhibitor may be in a range of about 1 wt % to about 4 wt % of total mixture. In one approach, a concentration of inhibitor may be about 1 wt % for printing a part by direct ink writing (DIW). In one approach, a concentration of inhibitor may be about 3 wt % for printing a part by PuSL.

In some approaches, the mixture of metal oxide nanoparticles in polymer resin may be blended into homogenous suspension slurry of nanoparticles to ensure uniform density of nanoparticles throughout the composite. In some approaches the mixture may be blended by sonication. In other approaches, the mixture may be blended using a mechanical mixer, for example, a resonant acoustic mixer.

Step 304 of method 300 involves forming a body of the mixture. In some approaches, step 306 involves forming a body by using the ink of a blended slurry ceramic mixture from step 302 as a feedstock for various additive manufacturing (AM) processes.

Figure 4B:
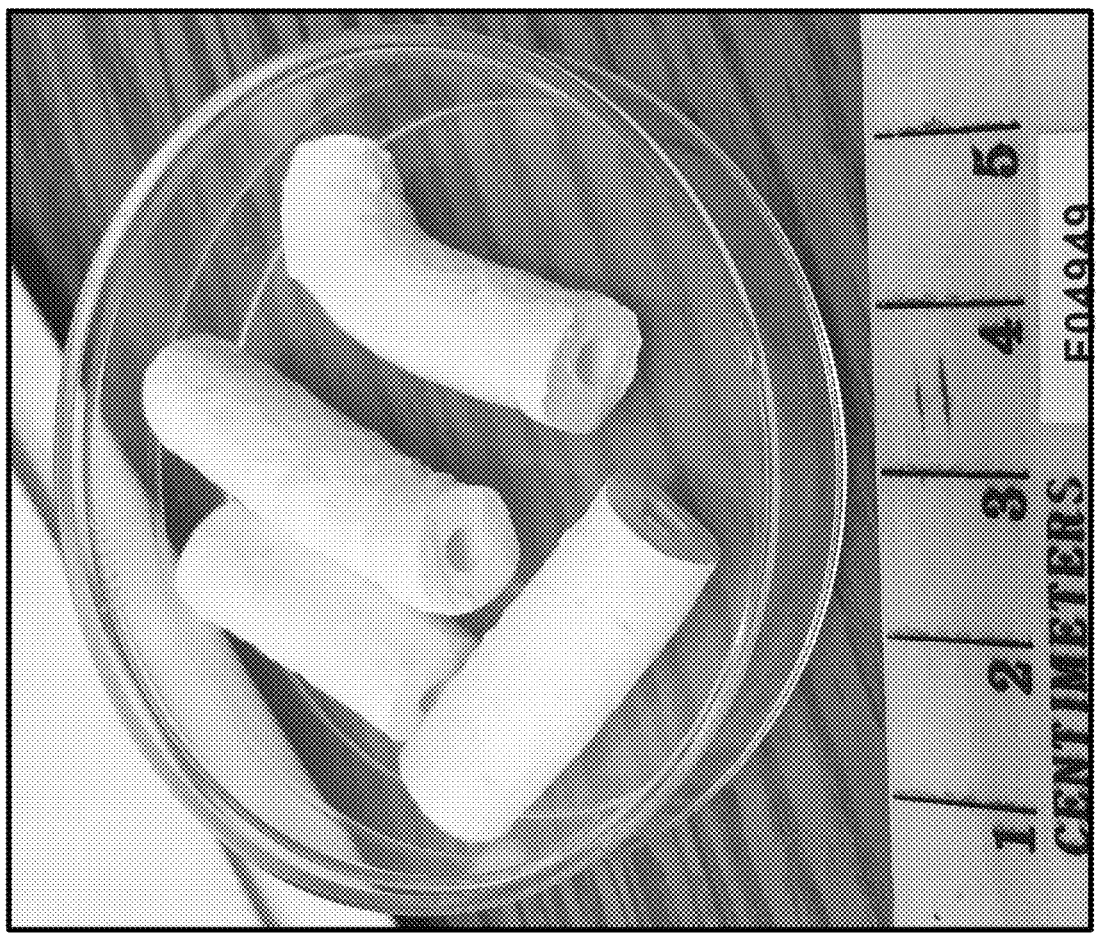
FIG. 4B is an image of three-dimensional porous ceramic structures, according to inventive concepts described herein.
Figure 4A:
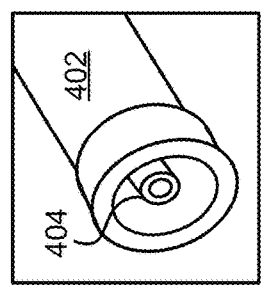
FIG. 4A is a schematic drawing of a portion of a device, according to inventive concepts described herein.

In some approaches of step 304 the body may be formed by pouring the mixture into a mold (e.g. cast, die, template, pattern, etc.) to create a casting of the mixture of metal nanoparticles and polymer. In some approaches, the homogenous slurry ceramic mixture may be cast into free standing porous 3D shapes, e.g. cylindrical shapes, tubular shapes, etc. A device (e.g. an extruder) may allow formation of a shape defined by extruder nozzle, die, etc. For example, FIG. 4A is a schematic drawing of a portion of an extruder 402 that forms a cylindrical shape defined by the nozzle 404. FIG. 4B shows several free-standing tubes formed from an extruded slurry mixture of 70 wt % 3Y-TZP in a range of several centimeters (cm) in length. In some approaches, the free standing porous structure may have an average diameter of greater than 1 cm, for example, pouring in a mold, extruding through a 1 cm diameter nozzle.

In some approaches of step 304, the additive manufacturing process may be direct ink writing, where the ink may be extruded through a nozzle. As would be understood by one skilled in the art, a structure formed by an additive manufacturing process has features that define the geometry, shape, dimensions, etc. of the structure. In some approaches, the features are formed during the additive manufacturing process and remain a part of the structure throughout the post-processing steps, e.g. after sintering of the structure. In some approaches, features of a structure formed by direct ink writing may have an average diameter of at least the diameter of the nozzle used to extrude the ink. For example, but not limited to, a structure formed with a nozzle having a diameter of 250 µm may have features with an average diameter of 250 µm. In other approaches, structures formed by DIW with a nozzle having a smaller diameter or a larger diameter may have features with an average diameter that is smaller or larger than 250 µm, respectively.

Examples of structures formed by DIW are shown in FIGS. 5A through 5F, in which a blended slurry ceramic mixture may be used as an ink for direct ink writing. FIG. 5A is a schematic drawing of an apparatus 502 with a nozzle 504 used in direct ink writing in which the blended slurry mixture may be used as an ink 506 extruded from the nozzle 504. The apparatus 502 moves in three dimensions (as shown in arrows x, y, and z) to form a 3D structure 508 with the extruded ink 506. As an example only, and in no way meant to be limiting, a blended slurry of 70 wt % 8 mol % $Y_2O_3$- $ZrO_2$ (8YSZ) with PEGDA may be used as an ink to form a log-pile 3D structure as shown in FIG. 5B. A top down view of the structure is shown in FIG. 5B with a magnified view of a portion depicting the porosity of the 3D structure. FIG. 5C is a perspective view of the log-pile 3D structure formed by direct ink writing.

FIGS. 5D-5F show the formation of a cylindrical 3D structure (e.g. a tube) using the blended slurry mixture as an ink in direct ink writing. The nozzle as shown in FIG. 5A extrudes the blended slurry mixture in a continuous cyclic pattern to form a hollow cylinder 3D structure.

In other approaches of step 304, the additive manufacturing process may be projection micro-stereolithography (PµSL). As would be understood by one skilled in the art, the ink formed from a blended slurry ceramic mixture of step 302 may include a UV initiator. Thus, in some approaches, the ink may be a UV-curable polymer resin to be used in PµSL in which a patterned part of porous ceramic structure may be formed. In some approaches, features of the formed body formed by PµSL may have an average diameter in a range of at least about 10 µm, but the average diameter could be less than 10 µm.

Figure 6A:
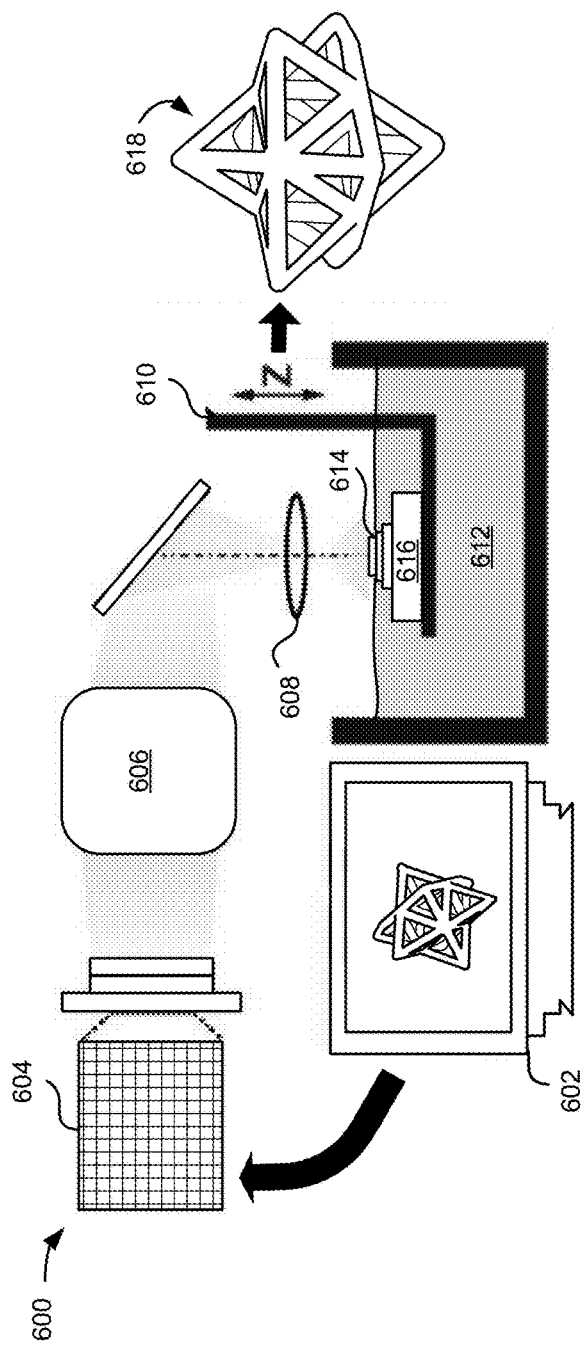
FIG. 6A is a schematic drawing of a process of projection micro-stereolithography.

FIG. 6A is a schematic drawing of a process 600 of forming a 3D structure 614 using PµSL with a UV-curable polymer resin. Briefly, and as an example but not meant to be limiting in any way, a 3D CAD model 602 may be used for a digital mask 604 to shine a pattern of light via beam delivery 606. A pattern may be projected through a projection lens 608 onto a substrate 616 in a bath of UV-curable ceramic/resin 612. A 3D structure 614 may be formed as the projected light reacts with the UV-curable ceramic/resin 612, and subsequent layers of the forming 3D structure 614 are formed as the substrate 616 on the elevator 610 moves in the z-direction. From the UV-curable ceramic/resin 612 a polymer part 618 may be formed.

Figure 6B:
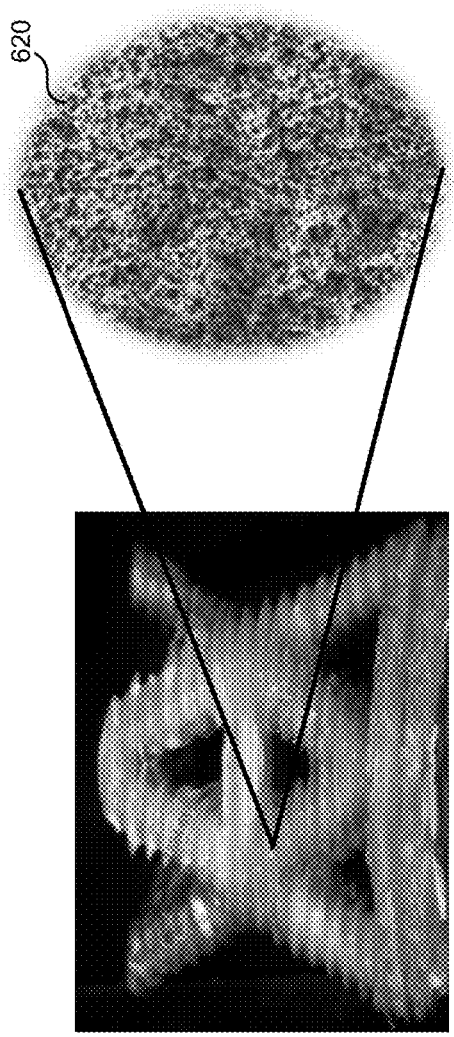
FIG. 6B is an image of a three dimensional structure formed by projection micro-stereolithography, according to various embodiment described herein.

FIG. 6B shows an example, that is not meant to be limiting, of a polymer-ceramic composite part formed from a blended slurry mixture of 60 wt % 3Y-TZP with PEGDA using an additive manufacturing technique of PµSL (before sintering and polymer burn-out). The magnified view 620 shows the porosity of a portion of the 3D structure after sintering.

Figure 14:
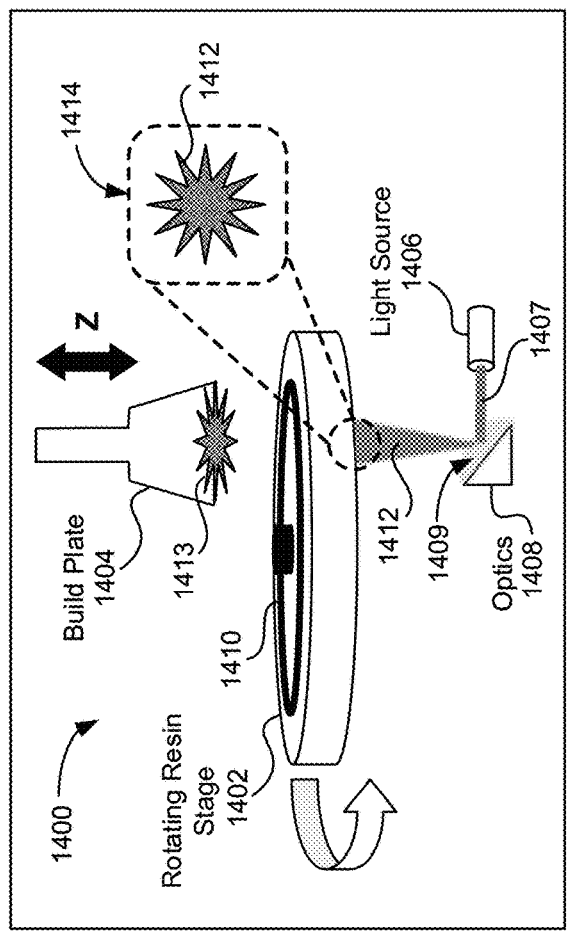
FIG. 14 is a schematic drawing of a projection microstereolithography system for high viscosity materials, according to one inventive concept described herein.

FIG. 14 is a schematic drawing of a process 1400 of forming a 3D structure 1413 using an alternative PµSL method with a UV-curable polymer resin, according to one aspect of an inventive concept. As an option, the present process 1400 may be implemented to construct structures such as those shown in the other FIGS. described herein. Of course, however, this process 1400 and others presented herein may be used to form structures which may or may not be related to the illustrative concepts listed herein. Further, the methods presented herein may be carried out in any desired environment. Moreover, more or less operations than those shown in FIG. 14 may be included in process 1400. It should also be noted that any of the aforementioned features may be used in any of the embodiments described in accordance with the various methods.

The process 1400 has evolved from the conventional process 600 of a PµSL method of printing structures using the ink described herein (see FIG. 6A). In one approach, the process 1400 of FIG. 14 is a unique type of PµSL system for printing loaded resins, e.g., inks having a high viscosity. Briefly, as an example, and not meant to be limiting in any way, a light source 1406 connected to a computer shines a light pattern 1407 to an optics 1408 having a mirror 1409, e.g., a concave mirror, that magnifies and focus the light pattern 1407 to be displayed as a defined magnified pattern 1412 (as shown in the top view 1414 of the defined magnified pattern 1412). A 3D structure 1413 may be formed on a Build Plate 1404 as the projected light pattern 1407 displays the defined magnified pattern 1412 that reacts with the UV-curable ceramic/resin 1410 on the Rotating Resin Stage 1402. The Build Plate 1404 moves in a z-direction to allow layers to be added to the 3D structure 1413.

In preferred approaches, the ink used as the UV-curable ceramic/resin 1410 of the PuSL process 1400 includes an inhibitor for tuning the polymerization of the resin during printing.

FIGS. 15A-15C depict images, as an example and not meant to be limiting in any way, of polymer-ceramic composite parts formed using the process 1400 of FIG. 14. FIG. 15A is an image of a polymer-ceramic composite part formed from a blended slurry of a curable resin including nanoparticles having an average diameter of 40 nm (50 wt % metal oxide). FIG. 15B is an image of a polymer-ceramic composite part formed from a blended slurry of a curable resin including nanoparticles having an average diameter of 90 nm (55 wt % metal oxide). As shown, the size of the filler particles may impact the cure depth and width of UV curable resins. The printing of the structure of FIG. 15A, using a UV curable resin having nanoparticles with an average diameter of 40 nm, generates a less stable structure having more structure defects, e.g., less defined edges, increased frequency of cracking in the structure, etc. compared to the printing of the structure of FIG. 15B, using a UV curable resin having nanoparticles with an average diameter of 90 nm.

As clearly shown in the structure of FIG. 15B, an inhibitor included in the UV-curable ceramic resin allowed printing of a defined geometric shape according to a projected pattern.

The following Equation 3 represents the cure depth $C_d$ of a structure:

$$C_d = D_p * \ln(E/E_c) \quad \text{Equation 3}$$

where $D_p$ is average diameter of a nanoparticle, E is incident energy, and $E_c$ is critical energy. Thus, a change in the average diameter $D_p$ of the nanoparticle may cause a change in cure depth $C_d$ when energy conditions are kept constant. For example, increasing the average diameter $D_p$ of the nanoparticle, while keeping the incident energy E and critical energy $E_c$ the same, e.g., unchanged, may result in a higher cure depth $C_d$.

FIG. 15C is a SEM image of a portion of the structure of FIG. 15B magnified 15000×.

Looking back to method 300 in FIG. 3, following formation of body from an ink, step 306 that involves curing the formed body. The process of curing the formed body may depend on the polymer and cross-linking agent used in forming the structure with the ink. In some approaches, a molded structure may be formed from an ink that includes a homogenous mixture of metal oxide nanoparticles, polymer resin, and a thermally-initiated cross-linking agent. In step 306, the molded structure may be cured by thermally-initiating the cross-linking agent.

In other approaches, the homogenous mixture of metal oxide nanoparticles, polymer resin, and cross-linking agent in the mold may be cured by UV light, for example, for structures formed by PμSL with a UV-curable ceramic/resin. In another approach, the slurry ceramic mixture may be printed into a 3D structure having a desired shape, and then cured.

Step 308 of method 300 includes heating the formed body to a first temperature for removing the polymer from the formed body. Step 308 may be performed at atmospheric pressure and under air. In some approaches of step 308, the heating the formed body to a first temperature may be stepwise heating process where the formed body of cured mixture may be heated to one temperature at a defined rate and then held at the temperature for a defined amount of time. The temperature may be raised at a defined rate to a higher hold temperature for a defined amount of time. These steps may be repeated. A final step of the first heating process may include cooling at a set rate. In some approaches, the parameters (e.g. temperature, rate of temperature change, timing, atmosphere, etc.) for step 308, a first heating process for removing the polymer, may depend on the materials, e.g. metal oxide nanoparticles, polymer resin, etc. In some approaches, the molded form may be heated to 400° C. for two hours to remove the polymer.

Step 308 of method 300 also includes heating the formed body to a second temperature for sintering the formed body of metal oxide nanoparticles for forming a porous ceramic material from the metal oxide nanoparticles. In some approaches, the second temperature for sintering may be different from the first temperature for removing the polymer. In some approaches, step 308 sinters the formed body of metal oxide nanoparticles, thereby creating a porous ceramic material having an open cell structure with a plurality of pores, where the pores connect through the ceramic material from one side of the ceramic material to an opposite side of the ceramic material. In some approaches, the metal oxide nanoparticles may be sintered to form a monolithic ceramic piece with pores. In various approaches, the pores of the ceramic material, formed following step 308, may have an average diameter in a range of about 50 nm to about 500 nm.

In some approaches, step 308 may include removing the cured polymer and sintering the metal oxide nanoparticles together to form a monolithic ceramic piece with pores. In one example, step 308 may include removing a cast of the cured mixture from a mold, and sintering the cast to remove the polymer component of the structure thereby creating pores in the cast.

In some approaches, step 308 of heating the formed body for sintering may include two or more heating steps. In some approaches of step 308, the heating the formed body to a second temperature may be stepwise heating process where the formed body of cured mixture with the polymer removed may be heated to one temperature at a defined rate and then held at the temperature for a defined amount of time. Then the temperature may be raised at a defined rate to a higher hold temperature for a defined amount of time. These steps may be repeated. A final step of the second heating process may include cooling at a set rate. The absence of polymer in the resulting sintered porous ceramic structure may be confirmed by thermogravimetric analysis (TGA).

In some approaches, step 308 may include the following parameters (e.g. temperature, rate of temperature change, timing, atmosphere, etc.) adjusted according to the type of metal oxide nanoparticles included for sintering, as would be appreciated by one skilled in the art upon reading the present description. In some approaches, the optimal sintering temperature may depend on the metal oxide nanoparticles in the mixture. In some approaches, the second temperature for sintering may be in a range of about 1100° C. to about 1300° C. The duration of time for heating at the second temperature for sintering the formed structure may be in a range of about 3 hours to about 15 hours. As an example, but not to be limiting in any way, formed structures of metal oxide nanoparticles may be heated to 1100° C. for 15 hours to sinter the structures. For some metal oxide nanoparticles, higher sintering temperatures may result in higher coarsening of the particles such that the sintered structure may have lower surface area and larger pores.

In one embodiment, a formed cast of a cured mixture may be removed from a mold, followed by heating the formed cast to remove the polymer content and sintering the cast to create pores in the cast. The resulting porous ceramic structure may be used for a variety of purposes, for example, the structure may function as a filter. In other approaches, a porous ceramic structure may function as support material for catalysis applications. In yet other approaches, a porous ceramic structure may function as a growth apparatus in growth media for cell culture growth.

In some approaches, the geometry of porous ceramic material may be multiple structures, extruded, milled, or molded into shapes (e.g. cylinder, cube, etc.), etc.

Step 310 of method 300 is an option step that includes crushing the porous ceramic structure formed in step 308 into a plurality of crushed pieces. In some approaches, each of the crushed pieces may have an average diameter of about 400 μm or smaller. In various approaches, the plurality of crushed pieces of porous ceramic material may be added to an aqueous sorbent solution such that the pores of the crushed pieces retain the aqueous sorbent solution by capillary action. The plurality of crushed pieces of porous ceramic material with aqueous sorbent solution may be used in an absorption/desorption bed system. In some approaches, the crushed pieces of porous ceramic material may 400 μm or smaller. In other approaches, the crushed pieces of porous material may be larger than 400 µm.

Infilling a Porous Ceramic Structure with Molten Hydroxide

In some approaches, step 312 of method 300 may include infilling the porous ceramic structure with a liquid material. In some approaches, the porous ceramic structure may be infilled with a material that includes an inorganic base material. For membrane application, the infilling liquid may be an inorganic compound (e.g. base) or mixture of compounds that has a high solubility of $CO_2$, such as sodium hydroxide, potassium carbonate, sodium borate, sodium phosphate, any of many other inorganic solvents that are bases in the sense of acid-base reactions, etc.

In some approaches, the porous ceramic structure may be filled with an inorganic base material that includes a molten hydroxide. In some approaches, the porous ceramic structure may be filled with a molten hydroxide that includes molten potassium hydroxide. In an exemplary approach, the porous ceramic structure may be infilled with a mixture of molten hydroxides, e.g. (LiNaK)OH.

The hydroxide may be heated to the melting temperature of the hydroxide thereby resulting in a molten hydroxide. The porous ceramic structure may be filled with the molten hydroxide at a temperature that maintains the molten nature of the hydroxide.

In one exemplary approach, a molten mixture of alkaline hydroxide may be infilled in the porous ceramic structure by a method of dipping. For example that is not meant to be limiting, the hydroxide may be melted to a liquid, e.g. molten hydroxide, at 400° C. Then, the porous ceramic structure is dipped into the molten hydroxide and removed from the molten hydroxide. Residual excess molten hydroxide may solidify on the surface of the porous ceramic structure as the excess molten hydroxide cools on the surface. The excess molten hydroxide on the surface of the porous ceramic is removed by heating the porous ceramic structure infilled with molten hydroxide to a temperature in the range of about 400° C. to about 550° C. thereby allowing the excess molten hydroxide on the surface to drip off the structure surface.

In some approaches, a product for capturing carbon dioxide may include a mixture of molten hydroxides in the pores of the ceramic structure. A method of using the porous ceramic structure may be as a support membrane for a continuous process of separating gases that includes contacting the gases with a molten hydroxide retained in the pores of a porous ceramic structure.

A continuous process for separating gases may begin with forming a ceramic structure having an open cell structure with a plurality of pores, where the pores connect through the ceramic structure from one side of the ceramic structure to an opposite side of the ceramic structure. In some approaches, a porous ceramic structure may be acquired commercially, e.g., from a vendor practicing methods of fabricating porous ceramic structures as described elsewhere herein.

For gas separation at high temperatures, the formed porous ceramic structure may be a support for molten hydroxide, molten salt mixtures, etc. for functioning as a mobile phase for selective separation in a dual-phase membrane. In some approaches, the dual-phase, molten salt membrane using the porous ceramic structure may function at temperatures above 300° C.

In some approaches, a continuous process of separating gases may include contacting the gases with the molten hydroxide in the formed ceramic structure such that the dual-phase, molten salt membrane may function as a continuous operation of feed side/sweep side (e.g. permeate and retentate sides) for efficient $CO_2$ gas capture and release. The feed side of the dual-phase, molten salt membrane includes contacting a gas mixture with the membrane (e.g. molten hydroxide of the porous ceramic structure). The dual-phase, molten salt membrane may selectively react with the $CO_2$ of the gas mixture and transport the $CO_2$ across the membrane to the sweep side of the membrane thereby resulting in a pure stream of $CO_2$ on the sweep side. In various approaches, the dual-phase, molten salt membrane may be tuned to separations of specific gases by using different salt mixtures, sweep gas, operating conditions, etc.

As described in inventive concepts herein, contacting a $CO_2$ gas with molten potassium hydroxide retained in a ceramic structure may result in a $CO_2$ permeance greater than about $2.5 \times 10^{-8}$ mol/m-s-Pa. Moreover, contacting a $CO_2$ gas with molten potassium hydroxide retained in a ceramic structure may result in a $CO_2$ permeability of greater than about 60 $10^{-12}$ mol/m-s-Pa.

In preferred approaches, a mixture of molten hydroxide (e.g. approximately equimolar amounts of NaOH/KOH/LiOH, or amounts in a range as described by the ratios provided below, in various embodiments) provides an exceptional ionic conductivity of 1 S/cm at 300° C. even though the viscosity thereof is in a range of approximately 2-3 centipoise. In another embodiment, the eutectic mixture may include alkali metal hydroxides according to a ratio of 4KOH:4NaOH: 1LiOH. In another embodiment, the mixture may include alkali metal hydroxides according to a ratio of 1KOH:1NaOH:4LiOH.

In preferred embodiments, the porous ceramic structure is infilled with a eutectic mix of NaOH/KOH/LiOH because the eutectic mix of NaOH/KOH/LiOH has a lower melting point and higher solubility of $CO_2$ and carbonate ions $CO_3^{2-}$ thereby allowing the molten hydroxide to remain liquid during a $CO_2$ separation process.

In one approach, porous ceramic structures infilled with molten hydroxide solution may be arranged in a multi-layer structure, stack, fixed packing, etc. to capture $CO_2$ from a mixed gas stream. Then the porous ceramic membrane structure may be treated with steam, in place or at another location, to de-gas, desorb, release, etc. the $CO_2$ from the membrane structure.

Infilling a Porous Ceramic Structure with Sorbent Solution

In other approaches, step 312 of method 300 may include infilling the porous ceramic structure with an aqueous sorbent solution. In various approaches, the porous ceramic structure may be infilled (e.g. soaked, infused, penetrated, permeated, etc.) with a sorbent solution. In some approaches, the porous ceramic structure may be filled with sorbent solution that has a preferentially high solubility of $CO_2$ and a low solubility of other gas stream components such as nitrogen and oxygen. Solutions that are alkaline are desirable because $CO_2$ tends to ionize in an alkaline solution to form bicarbonate ($HCO_3^-$) and carbonate ($CO_3^{2-}$) The sorbent solution may be an amine such as MEA or other amine-based solutions that have high solubilities for $CO_2$.

According to various inventive concepts described herein, a porous ceramic material may include an aqueous sorbent solution in the pores of the ceramic material, where a portion of the aqueous sorbent solution may be retained in the pores by capillary action. In some approaches, the porous ceramic material may be infilled with sorbent solution by soaking the porous ceramic structure in the sorbent solution. In other approaches, the porous ceramic structure may be infilled with sorbent solution by infusing the sorbent solution into the porous ceramic structure. In yet other approaches, the porous ceramic structure may be infilled with sorbent solution by penetrating (e.g. permeating) the structure with sorbent solution.

In some approaches, the temperature of gas separation may be about room temperature, for example, room temperature may be defined as a temperature in a range of about 20° C. to about 25° C.

For gas separation at low temperatures, the formed porous ceramic structure may be support for sorbent solution/ionic liquids that absorb $CO_2$ at temperatures typically below 50° C. In some approaches, the sorbent (e.g. ceramic structure with sorbent solution) becomes saturated with $CO_2$ and then may be regenerated by heating above about 100° C. thereby releasing the $CO_2$.

In some approaches, the sorbent solution added to the porous ceramic structures may be an aqueous sorbent solution. In some approaches, the solution may be an aqueous carbonate solution (for example, $Na_2CO_3$, $K_2CO_3$) for capture of $CO_2$ from mixed gas streams. In some approaches, the material added to the porous ceramic membrane may be an aqueous solution of sodium carbonate ($Na_2CO_3$), for example 20 wt % $Na_2CO_3$ at room temperature, or the concentration of $Na_2CO_3$ may be higher at higher temperatures that increase solubility of $Na_2CO_3$.

In other approaches, the sorbent solution may be an ionic liquid.

In some approaches, the sorbent solution may be an ionic liquid that may be designed specifically for $CO_2$ capture from mixed gas streams. In some approaches, the porous ceramic support membrane may be filled with ionic liquids that have physical characteristics that are challenging to use in conventional process equipment, for example, high viscosity and/or phase changes, etc.

In some approaches, the porous ceramic material is nanoporous such that the pores have an average diameter in a range of about 50 nm to about 300 nm (e.g. nanosize pores). The nanoporous ceramic material may have nanostructural support for the aqueous sorbent solution. Without wishing to be bound by any theory, it is believed that the nanostructural support within the ceramic material may enhance the rate of $CO_2$ absorption in the aqueous sorbent solution held in the nanopores of the ceramic material.

A porous ceramic material infilled with sorbent solution may increase the rate of absorption of $CO_2$ compared to bulk sorbent solution. The nanosize pores of the ceramic material may provide an environment of nano-confinement of the sorbent solution and thereby promote a higher rate of absorption/desorption of $Co_2$ compared to bulk sorbent solution having similar composition (e.g. 20 wt %) as the sorbent solution infilled in the porous ceramic material (e.g. 20 wt %). Without wishing to be bound by any theory, it is believed that the ceramic component of the sorbent provides a nano-confinement gas solubility effect that may increase the absorbent efficiency of the sorbent solution infilled in the porous ceramic structure by a factor of at least four, and in some cases by a factor of up to ten.

Figure 7:
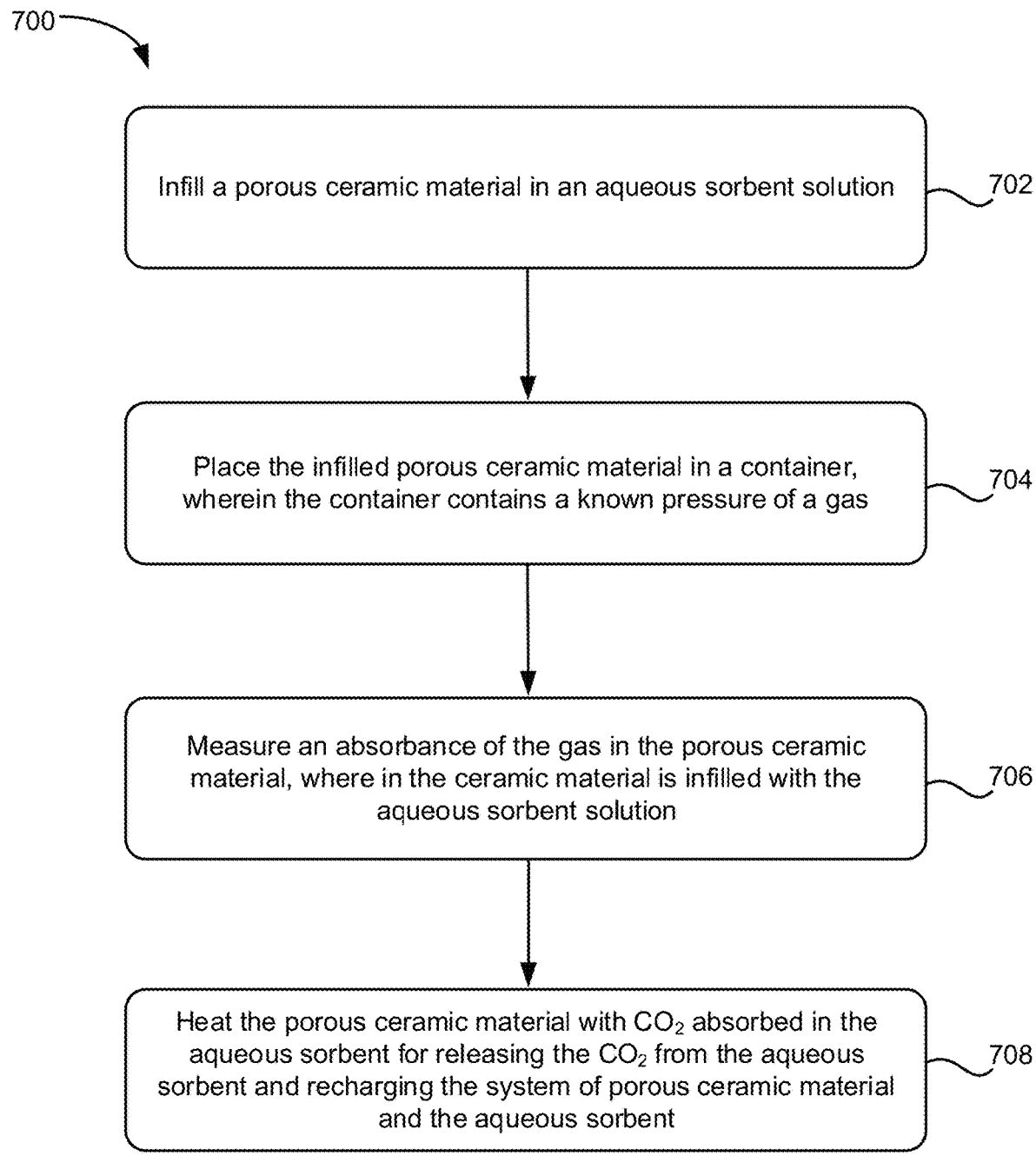
FIG. 7 is a flow chart of a method according to inventive concepts described herein.

Capture of $CO_2$ with a Porous Ceramic Material Infilled with Aqueous Sorbent Solution FIG. 7 shows a method 700 for separating gases with a system of porous ceramic material and an aqueous sorbent, according to inventive concepts described herein. As an option, the present method 700 may be implemented to construct structures such as those shown in the other FIGS. described herein. Of course, however, this method 700 and others presented herein may be used to form structures which may or may not be related to the illustrative concepts listed herein. Further, the methods presented herein may be carried out in any desired environment. Moreover, more or less operations than those shown in FIG. 7 may be included in method 700. It should also be noted that any of the aforementioned features may be used in any of the embodiments described in accordance with the various methods.

As shown in FIG. 7, method 700 begins with step 702 of infilling a porous ceramic material in an aqueous sorbent solution. Methods for infilling a porous ceramic material are described as would be understood by one skilled in the art upon reading this description.

In one approach, the porous ceramic material may include a plurality of porous ceramic pieces (e.g. roughly spherical, crushed porous ceramic structures), such that the average diameter of the plurality of crushed pieces is less than 400 μm. In some approaches, the crushed porous ceramic pieces may be suspended in aqueous sorbent solution such that crushed porous pieces may be free floating in the sorbent solution while the pores of the crushed porous ceramic pieces retain the absorbent solution.

For example, the porous ceramic material of crushed pieces infilled with aqueous sorbent solution may be arranged in a fluidized or packed bed system such that one bed would be for absorption of $CO_2$. Moreover, in some examples, the porous ceramic material of crushed pieces infilled with sorbent solution may be moved to a second bed for desorption of the $CO_2$ at a different temperature. Without wishing to be bound by any theory, it is believed that the increased surface area of the sorbent as indicated by the plurality of small pieces of porous ceramic structures in a sorbent solution provides faster rates of absorption/desorption of $CO_2$ compared to sorbent solution of similar composition as a bulk solution and also compared to sorbent solution infilled a porous ceramic structure (e.g. a non-crushed structure).

Step 704 of method 700 includes placing the infilled porous ceramic material in a container, where the container contains a known pressure of a gas.

Step 706 of method 700 includes measuring an absorbance of the gas, e.g. $CO_2$, in the porous ceramic material, where the ceramic material is infilled with the aqueous sorbent solution. In some approaches, the absorbance of the gas in the infilled porous ceramic material may be measured in terms of a pressure change of the gas in the container.

Step 708 of method 700 includes heating the porous ceramic material with $CO_2$ absorbed in the aqueous sorbent for releasing the $CO_2$ from the aqueous sorbent and recharging the system of porous ceramic material and the aqueous sorbent. In some approaches, the sorbent process may be used to separate $CO_2$ in a batch, step-wise, etc. operation. In other approaches, the porous ceramic material infilled with aqueous sorbent solution may be regenerated (also referred to as recharged). In some approaches, step 708 includes heating the infilled porous ceramic material for desorption of absorbed gas, where the aqueous sorbent solution is regenerated for a second absorption of gas. The regenerated sorbent of infilled porous ceramic structures may be used again to separate gases (e.g. capture $CO_2$).

In various approaches, the porous ceramic material may be a plurality of porous ceramic disks. In other approaches, the porous ceramic material may be plurality of shaped structures having a uniform shape, where the shaped structures may be packed in an absorbance bed. In yet other approaches, as described herein, the porous ceramic material may be in the form of crushed porous ceramic pieces.

In one approach, porous ceramic structures infilled with sorbent solution may be arranged in a multi-layer structure, stack, fixed packing, sheets, tiles with a large footprint area, etc. to capture $CO_2$ from a mixed gas stream. Then the porous ceramic structure with $CO_2$-saturated sorbent solution may be heated, in place or at another location, to de-gas, desorb, release, etc. the $CO_2$ from the sorbent.

Experiments

Fabrication of Porous Ceramic Membrane 14 mm diameter, 1 mm thick porous support ceramic membrane disks were fabricated by mixing different amounts of metal oxide nanoparticles (3 mol % $Y_2O_3$-doped $ZrO_2$ (3Y-TZP, Tosoh USA, Inc, Grove City, Ohio) and PEGDA (Mn 575). After mechanical mixing (LabRAM, Butte, Mont.) during 30 mins, 3 wt % Luperox® 231 sold by Sigma-Aldrich (St. Louis, Mo., USA) was added to the slurry mixture. The homogenous mixture was cast into punched discs silicon rubber, covered with a slide, and thermally cured at 80° C. during 5 h.

The polymer-ceramic nanoparticles were then removed from the molds. The polymer-ceramic nanoparticle molds were heated in a box furnace under air to remove the polymer template, holding at 180° C. for 2 hours, 250° C. for 4 hours, 400° C. for 2 hours, heating rate 1° C./min. The ceramic nanoparticle form was then heated to sinter the ceramic nanoparticle forms into a porous membrane by holding at 800° C. for 4 hours and 1100° C. for 15 hours, heating and cooling rate 2° C./min. In parallel, 3Y-TZP nanoparticles were sintered under similar conditions as the polymer-ceramic nanoparticle molds.

Figure 8A:
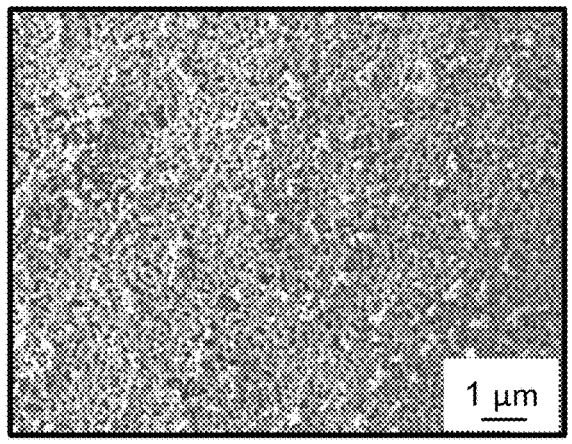
FIG. 8A is a scanning electron micrograph (SEM) image of 3Y-TZP 40 nm nanoparticles after sintering at low magnification (1 μm).
Figure 8B:
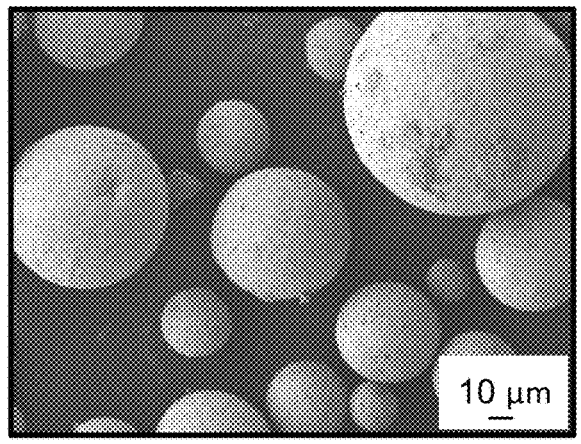
FIG. 8B is a SEM image of 3Y-TZP 40 nm nanoparticles after sintering at high magnification (10 μm).
Figure 8C:
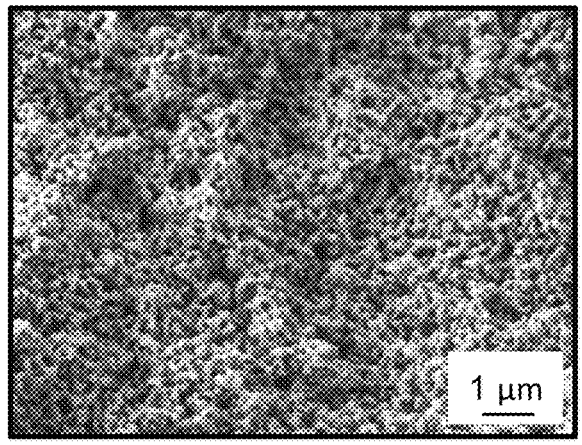
FIG. 8C is a SEM image of a 60 wt % 3Y-TZP porous membrane after sintering at low magnification (1 μm), according to inventive concepts described herein.
Figure 8D:
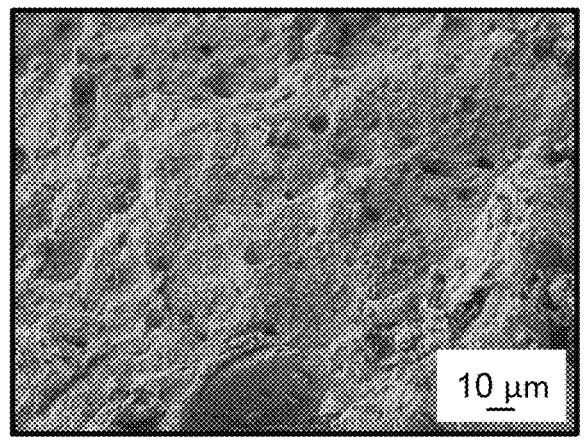
FIG. 8D is a SEM image of a 60 wt % 3Y-TZP porous membrane after sintering at high magnification (10 μm), according to inventive concepts described herein.

FIGS. 8A-8D show a clear difference in the density and pore size between 3 mol % $Y_2O_3$-doped $ZrO_2$ (3Y-TZP) ~40 nm particles (3Y-TZP nanoparticles without polymer, as received from the manufacturer) (FIGS. 8A-8B) and 60 wt % 3Y-TZP porous membranes (polymer-templated 3Y-TZP porous membranes, FIGS. 8C-8D), both after sintering cycle. With the sintered 3Y-TZP nanoparticles (FIGS. 8A and 8B) the pores that remain after sintering are smaller and the material is much denser than the porous material that results from the process described herein (FIGS. 8C and 8D). The sintered 3Y-TZP nanoparticles remain as spheres (as shown in the magnified view of FIG. 8B), which may be agglomerates of the particles as processed by the manufacturer using such methods as milling, sieving, etc. to produce spheres.

In contrast, sintered polymer-templated 3Y-TZP porous membranes formed by methods described herein (FIG. 8C and a zoomed-out view FIG. 8D) have a pore structure that is more open and the spherical agglomerates appear broken, fragmented, disintegrated, dispersed, etc., which suggests a homogenous dispersion of 3Y-TZP in the pre-polymer slurry.

Metal oxide/polymer ratios ranging between 50-70% wt % metal oxide were investigated; different metal oxides were studied including $Al_2O_3$ (90 nm particles), $CeO_2$ (20-30 nm particles), 8 mol % $Y_2O_3$ fully stabilized $ZrO_2$ (8YSZ, 600 nm particles) and 3Y-TZP (600 and 40 nm particles).

Infilling Porous Support Ceramic Membranes with Potassium Hydroxide

Figure 9B:
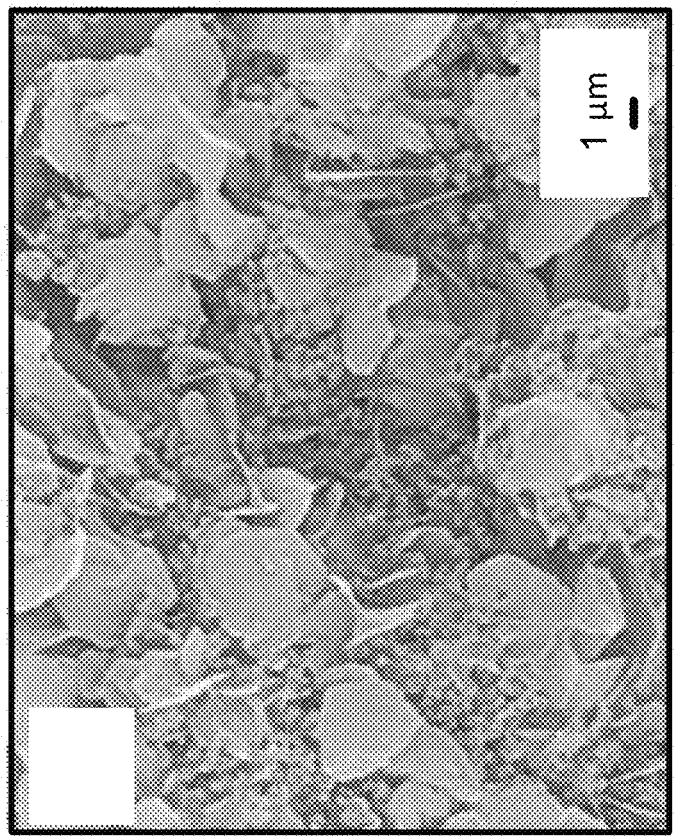
FIG. 9B is a SEM image of a fractured edge of a 60% 3Y-TZP porous membrane infilled with KOH, according to inventive concepts described herein.
Figure 9A:
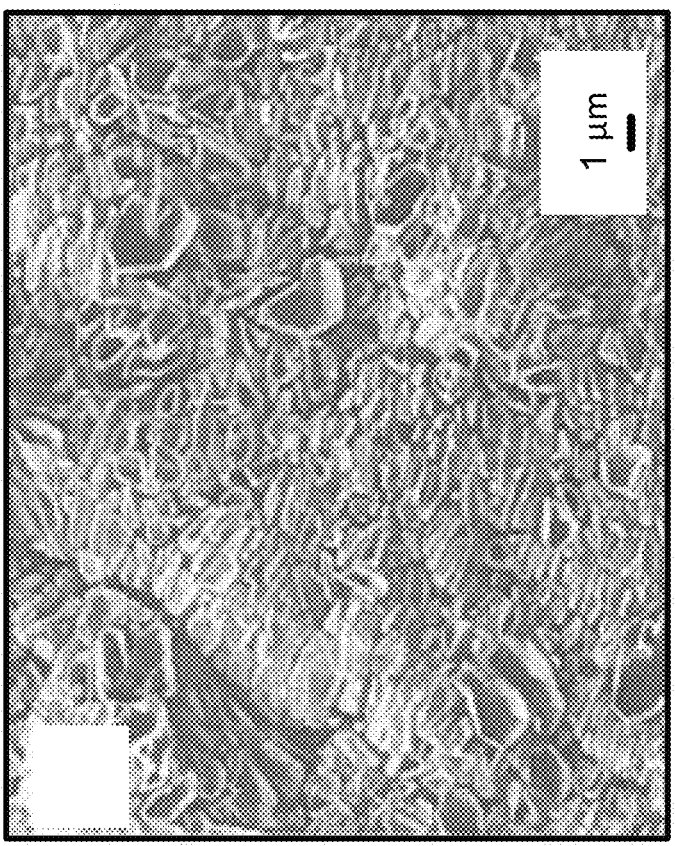
FIG. 9A is a SEM image of a 60 wt % 3Y-TZP porous membrane infilled with KOH, according to inventive concepts described herein.

After preparation of the porous support ceramic membranes, the stability and loading of the membranes with molten potassium hydroxide was studied. 5 g of potassium hydroxide pellets were melted in a zirconium crucible at 250° C. Different metal oxide porous membranes pre-weighed were immersed in the molten salt for 10 min, and weighed after infilling. FIGS. 9A-9B show SEM images of the surface of a 60 wt % 3Y-TZP porous membrane infilled with KOH (FIG. 9A) and a fracture edge of a 60 wt % 3Y-TZP porous membrane infilled with KOH (FIG. 9B).

Dual-phase membranes were then placed in a tube furnace and heated at 400° C. under $N_2$ atmosphere for 2 hours to remove the excess of molten hydroxide and water. Results of the hydroxide uptake for $Al_2O_3$, $CeO_2$, 8YSZ, and 3Y-TZP porous membranes are summarized in Table 1.

After testing the porous membranes with different metal oxides infilled with potassium hydroxide, it was observed that the $Al_2O_3$ based membranes showed the highest hydroxide uptake. However, exposure of the hydroxide infilled $Al_2O_3$ membranes to 400° C. bent the membranes and removing the hydroxide by dissolving in water the membranes collapsed. In contrast, hydroxide infilled $CeO_2$, 8YSZ, and 3Y-TZP dual-phase membranes survived after long-term heating at 400° C. It was observed that potassium hydroxide was retained within the porous membranes even after several heating and cooling cycles.

Figure 10A:
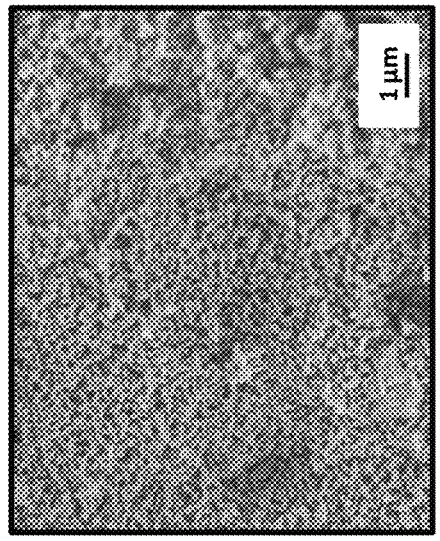
FIG. 10A is a SEM image of a 75 wt % 3Y-TZP porous membrane, according to inventive concepts described herein.
Figure 10B:
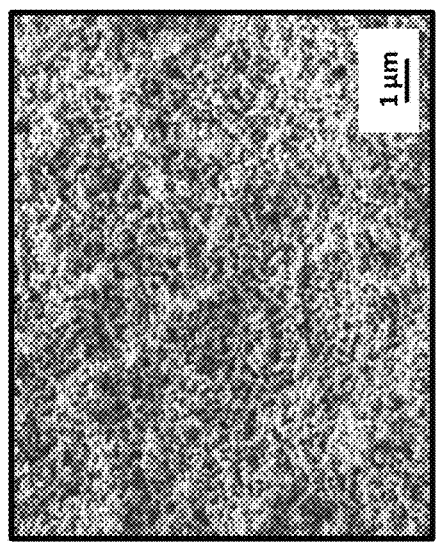
FIG. 10B is a SEM image of a 70 wt % 3Y-TZP porous membrane, according to inventive concepts described herein.
Figure 10C:
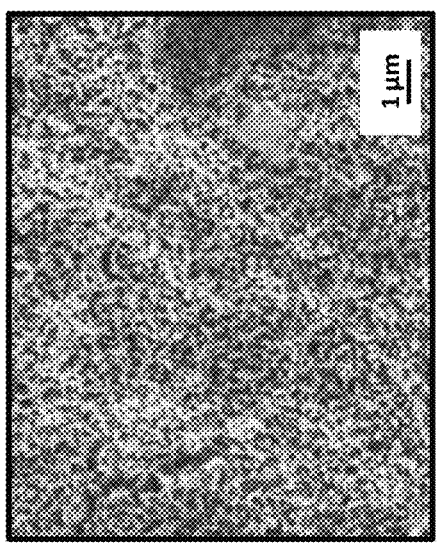
FIG. 10C is a SEM image of a 65 wt % 3Y-TZP porous membrane, according to inventive concepts described herein.
Figure 10D:
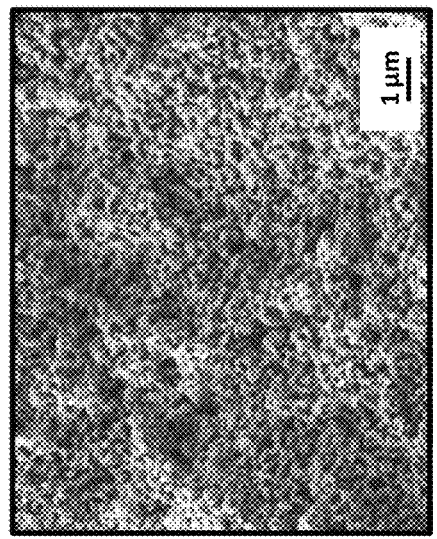
FIG. 10D is a SEM image of a 60 wt % 3Y-TZP porous membrane, according to inventive concepts described herein.
Figure 10E:
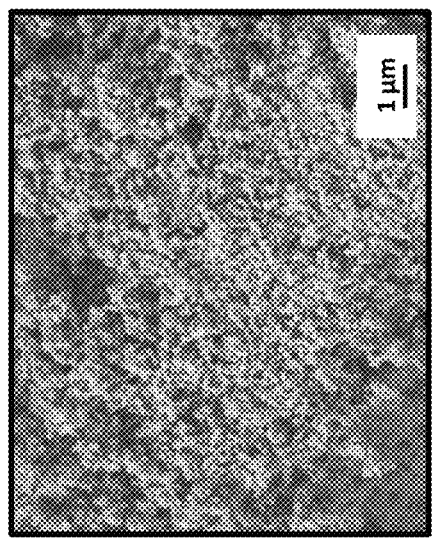
FIG. 10E is a SEM image of a 55 wt % 3Y-TZP porous membrane, according to inventive concepts described herein.

FIGS. 10A through 10E are SEMs of porous membranes formed from metal oxide polymer ratios in ranges between 75 wt % 3 mol % $Y_2O_3$- $ZrO_2$ (3Y-TZP) (FIG. 10A), 70 wt % 3Y-TZP (FIG. 10B), 65 wt % 3Y-TZP (FIG. 10C). 60 wt % 3Y-TZP (FIG. 10D), and 55 wt % 3Y-TZP (FIG. 10E). The final heating step in the sintering protocol for these membranes was 1100° C. for 15 hours. From these images, it is visually apparent that the density of the membrane of 75 wt % 3Y-TZP (FIG. 10A) is greater than the density of the membrane of 55% wt % 3Y-TZP (FIG. 10E).

Figure 11A:
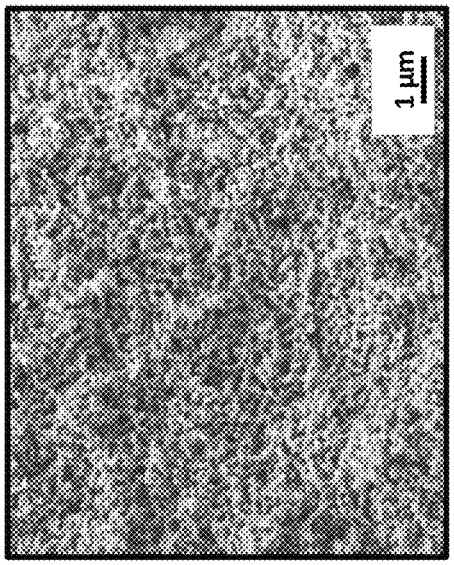
FIG. 11A is a high magnification SEM image of a 70 wt % 3Y-TZP porous membrane formed at a final heating step of 1100° C. for 15 hours, according to inventive concepts described herein.
Figure 11B:
FIG. 11B is a low magnification SEM image of a 70 wt % 3Y-TZP porous membrane formed at a final heating step of 1100° C. for 15 hours, according to inventive concepts described herein.
Figure 11C:
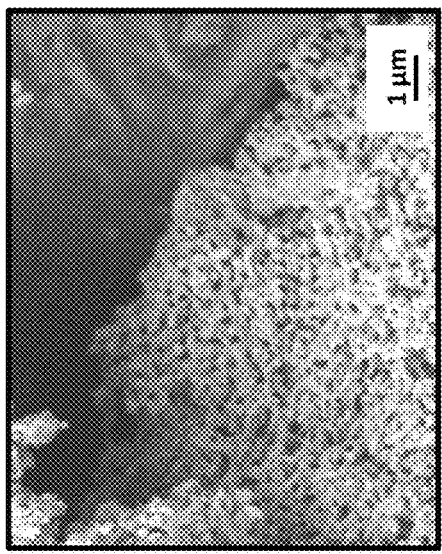
FIG. 11C is a high magnification SEM image of a 70 wt % 3Y-TZP porous membrane formed at a final heating step of 1200° C. for 3 hours, according to inventive concepts described herein.
Figure 11D:
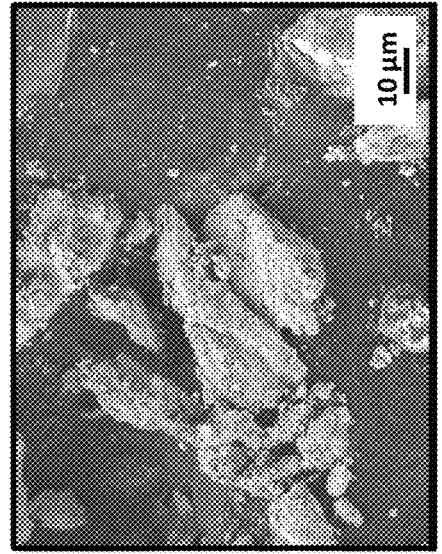
FIG. 11D is a low magnification SEM image of a 70 wt % 3Y-TZP porous membrane formed at a final heating step of 1200° C. for 3 hours, according to inventive concepts described herein.
Figure 11E:
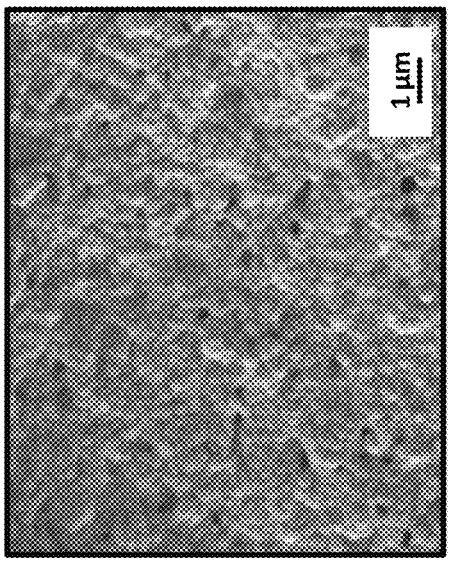
FIG. 11E is a high magnification SEM image of a 70 wt % 3Y-TZP porous membrane formed at a final heating step of 1300° C. for 5 hours, according to inventive concepts described herein.
Figure 11F:
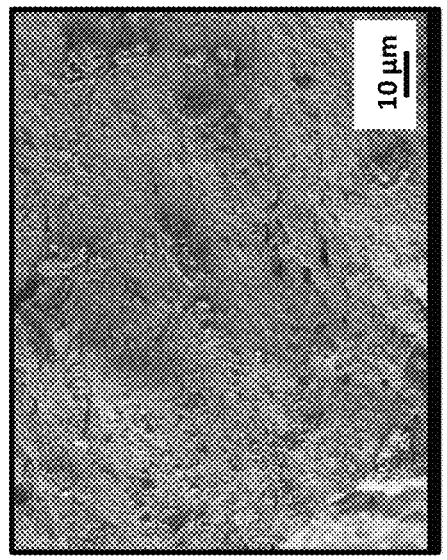
FIG. 11F is a low magnification SEM image of a 70 wt % 3Y-TZP porous membrane formed at a final heating step of 1300° C. for 5 hours, according to inventive concepts described herein.

FIGS. 11A-11F are SEM images of porous membranes of 70 wt % with different final heating steps in the sintering process. FIG. 11A (magnified image of FIG. 11B) and FIG. 11B involved a final heating step of 1100° C. for 15 hours. FIG. 11C (magnified image of FIG. 11D) and FIG. 11D involved a final heating step of 1200° C. for 3 hours. FIG. 11E (magnified image of FIG. 11F) and FIG. 11F involved a final heating step of 1300° C. for 5 hours.

Membrane properties of porous membranes formed from metal oxide polymer ratios in ranges between 55-75% wt % 3 mol % $Y_2O_3$- $ZrO_2$ (3Y-TZP) (as shown in SEM images of FIGS. 10A-10E and FIGS. 11A-11F) are shown in Table 2. Looking first at the sintering protocol of 1100° C. for 15 hours (upper set), membrane properties of surface area (BET theory), mesopore volume, and bending strength of membranes formed from 55 wt % to 75 wt % 3Y-TZP were compared. There was greater surface area and increased bending strength in the membranes formed from the higher wt % 3Y-TZP, whereas the mesopore volume did not significantly change between the membranes (Table 2). Differ-

TABLE 1

Behavior properties of porous ceramic membranes

| Metal Oxide | Membrane Composition (%) | Diameter Density (%) | KOH Uptake (%) | Days at 400° C. under $N_2$ | Weight lost of ceramic after long-term KOH exposure at 400° C.* |
|---|---|---|---|---|---|
| $Al_2O_3$ | 60 | 20 | 68 | 1 | Collapsed |
| $CeO_2$ | 65 | 30 | 29 | 4 | — |
| 8YSZ | 60 | 25 | 63 | 8 | 28 |
| 3Y-TZP (600 nm) | 60 | 32 | 62 | 8 | 5 |
| 3Y-TZP (40 nm) | 60 | 33 | 54 | 8 | 2 |

*Weight lost was calculated with respect to the initial weight of membranes, before infilling with potassium hydroxide.

ent sintering protocols were assessed from porous membranes formed from 60% wt % 3Y-TZP, 65 wt % 3Y-TZP, and 70 wt % 3Y-TZP at 1100° C. for 15 hours (upper set), 1300° C. for 5 hours (middle set), and 1200° C. for 3 hours (bottom set) in Table 2. Higher densities were evident with higher sintering temperatures for shorter amounts of time;

TABLE 2

Physical Properties of 3Y-$ZrO_2$ Structures Formed by Different Sintering Conditions

| 3Y-$ZrO_2$ wt % | Density (%) after sinter | LiNaKOH Uptake (wt %) | BET ($m^2$/g) | Meso Pore Volume ($mm^3$/g) | Bending Strength (Mpa) |
|---|---|---|---|---|---|
| 1100° C. 15 hrs | | | | | |
| 75% | 42.1 | 31 | 5.53 | 16.18 | 12.1 ± 0.6 |
| 70% | 37.9 | 35.9 | 5.58 | 19.47 | 7.5 ± 0.2 |
| 65% | 35.4 | 47.9 | 5.45 | 17.58 | 5.6 ± 0.4 |
| 60% | 32.1 | 53.4 | 5.36 | 17.67 | 4.1 ± 0.8 |
| 55% | 27.1 | 68.5 | 5.31 | 18.63 | 3.2 ± 0.8 |
| 1300° C. 5 hrs | | | | | |
| 70% | 81.7 | 3.6 | | | |
| 65% | 72.5 | 6.8 | | | |
| 60% | 62.3 | 9.3 | | | |
| 1200° C. 3 hrs | | | | | |
| 70% | 68.4 | 12.1 | | | |
| 65% | 58.7 | 16.4 | | | |
| 60% | 48.7 | 19.6 | | | | however, better uptake of LiNaKOH was evident with membranes formed by sintering at the lower temperature of 1100° C. for 15 hours.

Figure 12:
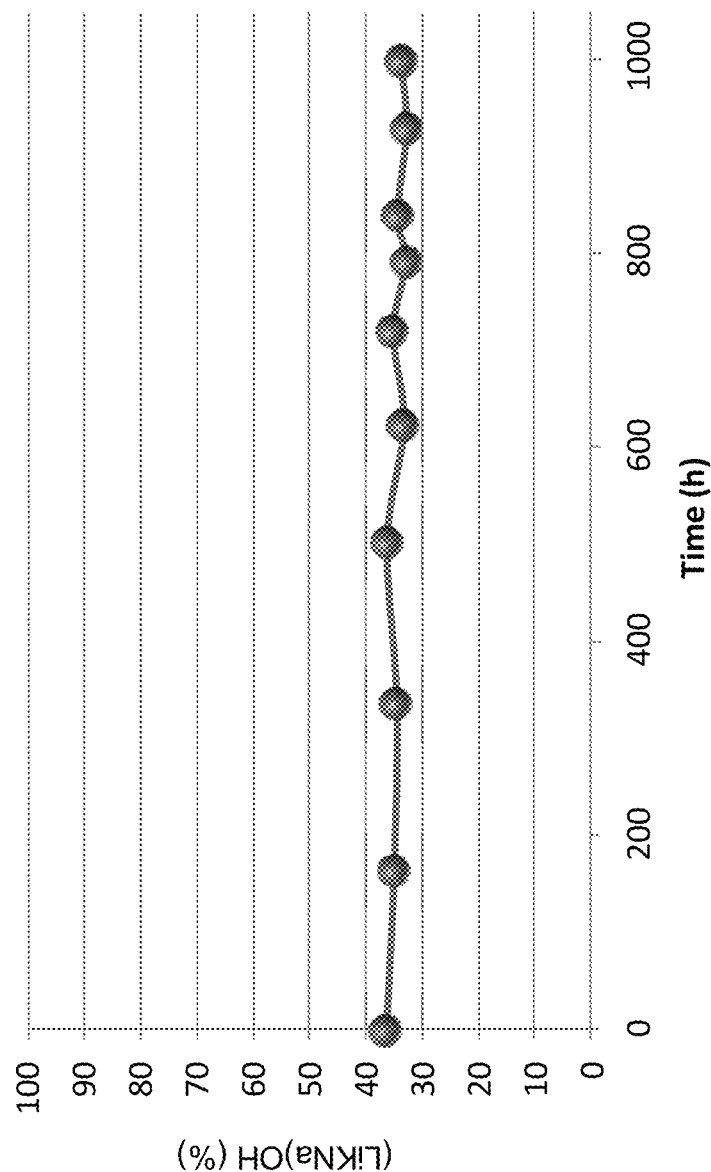
FIG. 12 is plot of the chemical stability of (LiKNa) OH infilled in a porous 70 wt % 3Y-TZP membrane over 1000 hours, according to inventive concepts described herein.

Moreover, as shown in FIG. 12 molten LiNaKOH infilled in porous 70 wt % 3Y-TZP membranes demonstrated chemical stability for at least 1000 hours at 550° C. Over the time period, no significant mass loss was detected in the samples.

Membrane Evaluation in Realistic Conditions

Membrane performance under realistic operating conditions of a porous ceramic structure infilled with molten phase. A custom-designed high-temperature permeation cell was placed into a furnace while different mixtures of feed and sweep gasses were introduced. The sweep gas was humidified by passing pre-heated helium (He) through a beaker of boiling water. After passing by the membrane, the sweep gas entered a gas chromatograph to determine the concentration of $CO_2$.

For evaluation, disc-shaped 3Y-TZP supports were glued into a non-porous alumina "donut" before infilling with the hydroxide mixture, and then sealed into the cells using graphite gaskets. Membranes were tested for leaks before single (100% $CO_2$) and binary mixed gas (50:50 $CO_2/N_2$) permeation experiments were performed. $CO_2$ permeabilities of $5.17 \times 10^{-11}$ mol m $m^{-2}$ $s^{-1}$ $Pa^{-1}$ and $5.41 \times 10^{-11}$ mol m $m^{-2}$ $s^{-1}$ $Pa^{-1}$ were obtained for the membrane using single and binary mixed gas, respectively, at 550° C. When the temperature was increased to 650° C., $CO_2$ permeability increased to $8.64 \times 10^{-11}$ mol m $m^{-2}$ $s^{-1}$ $Pa^{-1}$ and $10.3 \times 10^{-11}$ mol m $m^{-2}$ $s^{-1}$ $Pa^{-1}$ for single and binary mixed gas, respectively. Very high $CO_2$ permeability of $9.83 \times 10^{-11}$ mol m $m^{-2}$ $s^{-1}$ $Pa^{-1}$ at 650° C. was observed even without humidified sweep gas. Without wishing to be bound by any theory, the high $CO_2$ permeability seemed to be due to the high concentration of hydroxide in the molten phase.

The molten hydroxide dual-phase membranes have $CO_2$ permeability that is an order of magnitude higher than the best molten carbonate membrane. It should be noted that the custom permeation cell was limited to a maximum of 1 atm of water vapor. If it were possible to introduce pressurized steam, the permeability might be expected to increase further, especially at lower temperature.

The 3Y-TZP ceramic dual phase system with molten 42.5Li/32.5Na/25K formed by methods described herein demonstrated higher $CO_2$ permeance and higher $CO_2$ permeability compared to the conventional dual phase membrane systems.

Infilling Porous Support Ceramic Membranes with Aqueous Sorbent Solutions

Porous ceramic membrane disks were soaked in a solution of 20% $Na_2CO_3$ (FIG. 13A) or ionic liquids (ILs) such as IL1 (NDIL0309) (FIG. 13B) and IL2 (NDIL0230) (FIG. 13C) for times up to 30 minutes at room temperature. The ionic liquids IL1 (NDIL0309) and IL2 (NDIL0230) were designed specifically for $CO_2$ capture from mixed gas streams. Like many ILs, these have high viscosity and/or phase changes that make them challenging to use in conventional process equipment. Various embodiments described herein may allow these ILs to be used industrially at lower cost and with higher efficiency.

The porous ceramic membranes were fabricated in different geometries. For $Na_2CO_3$ infill studies (FIG. 13A), geometries included 60% $ZrO_2$ (3Y-TZP) disks with dimensions of 14 mm diameter, 2 mm thick, and 70% $ZrO_2$ (3Y-TZP) disks with dimensions of 14 mm diameter, 1 mm thick and 14 mm diameter, 2 mm thick. The infill studies also included a control of solution only (without porous ceramic membranes).

For ionic liquid 1 (IL1, NDIL0309) infill studies (FIG. 13B), geometries included ceramic membrane formed with 70% $ZrO_2$ material (3Y-TZP) and crushed into heterogeneous pieces and sieved through a 381 μm filter so that pieces were smaller than 381 μm (381 μm 70% $ZrO_2$ crushed). Other ceramic membranes in different geometries tested included 70% $ZrO_2$ (3Y-TZP) cylinders with dimensions of 400 μm diameter, 1 mm length, and 600 μm diameter, 1 mm length, and 70% $ZrO_2$ (3Y-TZP) disks with dimensions of 14 mm diameter, 2 mm thick. The infill studies also included a control of IL1 only (without porous ceramic membranes).

For ionic liquid 2 (IL2, NDIL0230) infill studies (FIG. 13C), ceramic membranes in different geometries included 381 μm 70% $ZrO_2$ crushed membranes as described above, and 70% $ZrO_2$ (3Y-TZP) disks with dimensions of 14 mm diameter, 2 mm thick and 14 mm diameter, 1 mm thick. The infill studies also included a control of IL2 only (without porous ceramic membranes).

The methodology for the infill studies of the various ceramic membranes with sorbent solutions involved weighing the ceramic membrane samples before and after soaking with the sorbent solution so that a soak weight could be obtained before and after the pores were infilled with the solution. The uptake of $CO_2$ was measured in the infilled-porous ceramic membrane samples by measuring the change of $CO_2$ pressure of the $CO_2$ atmosphere over time at room temperature. As $CO_2$ was absorbed the pressure of the $CO_2$ atmosphere changed in a decreasing manner, and a rate of absorption of the infilled-porous ceramic membrane disks was obtained.

In each study of a sorbent solution, the ceramic membrane samples were measured for rate of absorption after soaking the samples 30 seconds and 5 minutes at room temperature, as shown in FIGS. 13A-13C.

As shown in FIG. 13A, the porous ceramic membranes infilled with $Na_2CO_3$ absorbed $CO_2$ at a higher rate the first 30 seconds than solution alone. The rate of absorption for all tested ceramic membranes decreased significantly from 30 seconds to 5 minutes.

The ionic liquids, IL1 and IL2 tested in infill experiments showed similar results, FIG. 4B and FIG. 4C, respectively. Crushed porous membranes (381 μm 70% $ZrO_2$ crushed) and 2 mm×14 mm 70% $ZrO_2$ disks demonstrated a remarkably higher rate of absorbance at 30 seconds compared to 5 minutes with both ionic liquids tested. Moreover, the crushed membranes demonstrated a higher rate of absorbance compared to the membranes in disk-shaped geometries. Ceramic membranes having cylinder-shaped geometries, only tested with IL2 (FIG. 13B), demonstrated higher rates of absorption compared to disk-shaped geometries.

In Use

Various embodiments of porous ceramic membranes with sorbent solution may function in applications of $CO_2$ separation and sequestration. In some approaches, the porous ceramic membranes with sorbent solution may be useful in carbon capture and storage (CCS), greenhouse gas reduction, and pollution mitigation.

Porous ceramic structures as described may be used as a support material for a liquid/molten phase that may be used in membrane separation techniques, ion conduction, gas sorption, etc.

Unfilled porous ceramic structures may be used as filtration media and used in specialized filtration applications. In some approaches, the porous ceramic structures may be used as high temperature fire-resistant HEPA filters and pre-filters for nuclear applications.

According to inventive concepts described herein, a porous ceramic structure may be used as a support material for catalysis applications.

Inventive concepts as described herein may be used as material for high temperature sensors. Furthermore, the structures as presented may be optimal for high temperature oxide supports and/or membranes used in electrolytic cells and fuel cells.

Moreover, the porous ceramic structure may function as structural material for growth media for cells, for example, as a structure in liquid for the cells to latch onto during cell growth and culture.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While inventive concepts have been described above, it should be understood that they have been presented by way of example only, and not limitation. Thus, the breadth and scope of the various aspects of the present invention should not be limited by any of the above-described exemplary approaches, but should be defined only in accordance with the following claims and their equivalents.

What is claimed is:

1. A product, comprising:
    a ceramic material having an open cell structure with a plurality of pores, wherein the pores connect through the ceramic material from one side of the ceramic material to an opposite side of the ceramic material; and
    an aqueous sorbent solution for absorbing carbon dioxide, the aqueous sorbent solution being positioned in the pores of the ceramic material, wherein a portion of the aqueous sorbent solution is retained in the pores by capillary action.

2. The product as recited in claim 1, wherein the ceramic material comprises $Y_2O_3$-doped $ZrO_2$.

3. The product as recited in claim 1, wherein an average diameter of the pores is in a range of about 50 nanometers to about 500 nanometers.

4. The product as recited in claim 1, wherein an average diameter of the pores is in a range of about 50 nanometers to about 200 nanometers.

5. The product as recited in claim 1, wherein a density of the ceramic material is in a range of about 20% to about 50% of a density of a solid nonporous ceramic form having the same composition as the ceramic material.

6. The product as recited in claim 1, wherein the ceramic material is in a form of a structure comprising a plurality of crushed ceramic pieces, wherein an average diameter of the crushed ceramic pieces is less than 400 microns.

7. The product as recited in claim 1, wherein the aqueous sorbent solution is an ionic solution.

8. The product as recited in claim 1, wherein the ceramic material is nanoporous having nanostructural support for the aqueous sorbent solution.

9. A method of forming the ceramic material as recited in claim 1, the method comprising:
    obtaining an ink, wherein the ink comprises a mixture of metal oxide nanoparticles and a polymer;
    forming a body from the ink, wherein forming the body comprises an additive manufacturing process with the ink;
    curing the formed body; and
    heating the formed body for removing the polymer and for forming the ceramic material from the metal oxide nanoparticles.

10. The method of claim 9, wherein the additive manufacturing process is direct ink writing, wherein the ink is extruded through a nozzle.

11. The method of claim 10, wherein features of the formed body have an average diameter of at least a diameter of the nozzle.

12. The method of claim 9, wherein the ink includes a photoinitiator and an inhibitor, wherein the additive manufacturing is projection micro-stereolithography.

13. The method as recited in claim 12, wherein features of the formed body have an average length of at least about ten microns.

14. The method as recited in claim 9, wherein the formed body is a free standing porous structure, wherein the formed body has an average diameter of greater than one centimeter.

15. The method as recited in claim 9, wherein the ink comprises metal oxide nanoparticles and a polymer resin, wherein a concentration of the metal oxide nanoparticles is at least about 50 wt % of a total mass of the ink.

16. The method as recited in claim 15, wherein the ink comprises a cross-linking agent.

17. The method as recited in claim 15, wherein the ink includes metal oxide nanoparticles in a range of about 50 wt % to about 80 wt % of the total mass of the ink.

18. The method as recited in claim 15, wherein a concentration of the metal oxide nanoparticles is about 60 wt % of the total mass of the ink.

19. The method as recited in claim 15, wherein a concentration of the metal oxide nanoparticles is about 70 wt % of the total mass of the ink.

20. The method as recited in claim 15, wherein the metal oxide nanoparticles comprise $Y_2O_3$-doped $ZrO_2$.

21. The method as recited in claim 20, wherein the metal oxide nanoparticles comprising $Y_2O_3$-doped $ZrO_2$ have an average diameter in a range of at least about 20 nanometers to about 600 nanometers.

22. A product comprising:
   a ceramic material having an open cell structure with a plurality of pores, wherein the pores connect through the ceramic material from one side of the ceramic material to an opposite side of the ceramic material; and
   an aqueous sorbent solution in the pores of the ceramic material, wherein a portion of the aqueous sorbent solution is retained in the pores by capillary action,
   wherein the aqueous sorbent solution is sodium carbonate having a concentration of about 20 wt % solution at room temperature.

23. The product as recited in claim 22, wherein the ceramic material comprises $Y_2O_3$-doped $ZrO_2$.

24. The product as recited in claim 22, wherein an average diameter of the pores is in a range of about 50 nanometers to about 500 nanometers.

25. The product as recited in claim 22, wherein an average diameter of the pores is in a range of about 50 nanometers to about 200 nanometers.

26. The product as recited in claim 22, wherein a density of the ceramic material is in a range of about 20% to about 50% of a density of a solid nonporous ceramic form having the same composition as the ceramic material.

27. The product as recited in claim 22, wherein the ceramic material is in a form of a structure comprising a plurality of crushed ceramic pieces, wherein an average diameter of the crushed ceramic pieces is less than 400 microns.

28. The product as recited in claim 22, wherein the aqueous sorbent solution is an ionic solution.

29. The product as recited in claim 22, wherein the ceramic material is nanoporous having nanostructural support for the aqueous sorbent solution.

30. A porous ceramic structure comprising:
   a three-dimensional printed structure having predefined features,
   wherein the three-dimensional printed structure has a geometric shape,
   wherein an average length of the features is at least 10 microns,
   wherein the predefined features comprise a ceramic material having a plurality of pores,
   wherein an aqueous sorbent solution for absorbing carbon dioxide is positioned in the pores of the ceramic material, wherein a portion of the aqueous sorbent solution is retained in the pores by capillary action.

31. A filtration medium comprising the porous ceramic structure as recited in claim 30.

32. The porous ceramic structure as recited in claim 30, wherein the porous ceramic material comprises $Y_2O_3$-doped $ZrO_2$.

33. The porous ceramic structure as recited in claim 30, wherein an average diameter of the pores is in a range of about 50 nanometers to about 500 nanometers.

34. The porous ceramic structure as recited in claim 30, wherein the ceramic structure has an open cell structure.

35. The porous ceramic structure as recited in claim 30, wherein the pores form continuous channels through the ceramic material from one side of the ceramic material to an opposite side of the ceramic material.

* * * * *